US010525331B2

(12) United States Patent
Okada

(10) Patent No.: US 10,525,331 B2
(45) Date of Patent: Jan. 7, 2020

(54) INFORMATION PROCESSING DEVICE, INFORMATION PROCESSING METHOD AND COMPUTER PROGRAM

(71) Applicant: Capy Inc., Newark, DE (US)

(72) Inventor: Mitsuo Okada, Kyoto (JP)

(73) Assignee: Capy, Inc., Newark, DE (US)

( * ) Notice: Subject to any disclaimer, the term of this patent is extended or adjusted under 35 U.S.C. 154(b) by 354 days.

(21) Appl. No.: 14/901,671

(22) PCT Filed: Jul. 7, 2014

(86) PCT No.: PCT/JP2014/068064
§ 371 (c)(1),
(2) Date: Dec. 28, 2015

(87) PCT Pub. No.: WO2015/002322
PCT Pub. Date: Jan. 8, 2015

(65) Prior Publication Data
US 2016/0129339 A1    May 12, 2016

(30) Foreign Application Priority Data
Jul. 5, 2013    (JP) .................................. 2013-141307

(51) Int. Cl.
*A63F 9/06* (2006.01)
*G06F 3/0486* (2013.01)
*G06F 3/0484* (2013.01)

(52) U.S. Cl.
CPC .......... *A63F 9/0612* (2013.01); *G06F 3/0486* (2013.01); *G06F 3/04845* (2013.01)

(58) Field of Classification Search
None
See application file for complete search history.

(56) References Cited

U.S. PATENT DOCUMENTS

2005/0093232 A1* 5/2005 Stout .................... A63F 9/10
273/153 R
2009/0258687 A1* 10/2009 Weichselbaum .......... A63F 9/10
463/9

(Continued)

FOREIGN PATENT DOCUMENTS

GB    2486707        6/2012
GB    2486707 A  *  6/2012    ........... G06F 1/3262

(Continued)

OTHER PUBLICATIONS

Extended European Search Report dated Nov. 25, 2016, from European Patent Application No. 14820108.0, 9 pp.

(Continued)

*Primary Examiner* — James S. McClellan
*Assistant Examiner* — Peter J Iannuzzi
(74) *Attorney, Agent, or Firm* — Klarquist Sparkman, LLP

(57) ABSTRACT

[Problem] In the past, a prescribed action could not be executed through an enjoyable operation. [Solution] The information processing device according to one embodiment comprises an output unit for outputting one or more blank areas corresponding to one or more items of blank area information, and one or more objects; a receiving unit for receiving a move command with respect to the object; a mover unit for moving the object in response to a move command received by the receiving unit; and an execution unit for, in cases where the position of an object moved by the mover unit exists in a predetermined positional relationship with respect to the blank area, executing an action that corresponds to the blank area or moved object.

18 Claims, 19 Drawing Sheets

(56) References Cited

U.S. PATENT DOCUMENTS

| | | | |
|---|---|---|---|
| 2012/0229520 A1 | 9/2012 | Mikami et al. | |
| 2012/0323700 A1 | 12/2012 | Aleksandrovich et al. | |
| 2013/0027433 A1* | 1/2013 | Hand | G06F 3/04883 345/650 |
| 2013/0029731 A1* | 1/2013 | Fuchigami | H04M 1/72577 455/566 |
| 2013/0079079 A1* | 3/2013 | Bouchard | A63F 9/0612 463/9 |
| 2014/0289625 A1* | 9/2014 | Mandalia | G06F 3/01 715/716 |
| 2014/0366124 A1 | 12/2014 | Takehara et al. | |

FOREIGN PATENT DOCUMENTS

| | | |
|---|---|---|
| JP | 10-260782 | 9/1998 |
| JP | 2012-133787 | 7/2012 |
| JP | 2013-26940 | 2/2013 |
| JP | 2012-190353 | 10/2014 |
| WO | WO 2012/093784 | 7/2012 |
| WO | WO 2013/094065 | 6/2013 |

OTHER PUBLICATIONS

International Search Report dated Oct. 7, 2014, from International Patent Application No. PCT/JP2014/068064, 5 pp.
Athanasopoulos et al., "Enhanced CAPTCHAs: Using Animation to Tell Humans and Computers Apart," *LNCS* 4237, pp. 97-108 (2006).

* cited by examiner

| ID | SHAPE | SIZE | POSITION | EXECUTABLE INFORMATION |
|---|---|---|---|---|
| 1 | RECTANGULAR | (L1,H1) | (x1,y1) | ABC.exe |
| 2 | RECTANGULAR | (L2,H2) | (x2,y2) | XYZ.exe |

FIG.6

| ID | OJBECT IDENTIFIER | EXECUTABLE INFORMATION ||
|---|---|---|---|
| | | ACTION IDENTIFIER | ARGUMENT |
| 1 | 102 | sendmessage | message1, add1 |
| 2 | 103 | retrieve | URL2 |
| 3 | 104 | retrieve | URL3 |

FIG.11

| ID | BLANK AREA IDENTIFIER | EXECUTABLE INFORMATION |
|---|---|---|
| 1 | 122 | jump_nextpage |
| 2 | 123 | jump_buypage |

FIG.13

| ID | BLANK AREA IDENTIFIER | OBJECT IDENTIFIER | EXECUTABLE INFORMATION |
|---|---|---|---|
| 1 | 122 | 102 | e1.exe |
| 2 | 122 | 103 | e2.exe |
| 3 | 122 | 104 | e3.exe |
| 4 | 123 | 102 | e4.exe |
| 5 | 123 | 104 | e5.exe |

FIG.15

INFORMATION PROCESSING DEVICE, INFORMATION PROCESSING METHOD AND COMPUTER PROGRAM

CROSS REFERENCE TO RELATED APPLICATIONS

This is the U.S. National Stage of International Application No. PCT/JP2014/068064, filed Jul. 7, 2014, which in turn claims the benefit of Japanese Patent Application No. 2013-141307, filed Jul. 5, 2013. Both applications are incorporated herein in their entirety.

FIELD

The present invention relates inter alia to an information processing device that performs a predetermined action in cases where one or more objects have been moved to a prescribed blank area on a screen.

BACKGROUND

Conventionally, in various types of applications that are installed on PCs, smartphones, and the like, the user executes an action with a finger, or an input device such as a mouse, to press a button in the application.

A technique for providing a user-friendly GUI is disclosed in Japanese Patent Application Laid-Open Publication No. 10-260782 (hereinafter "Patent Reference 1"). The entire contents of Patent Reference 1 are hereby incorporated herein by reference.

PRIOR ART REFERENCES

Patent References

Patent Reference 1: Japanese Patent Application Laid-Open Publication No. 10-260782 (page 1, FIG. 1, etc.)

SUMMARY

However, the prior art operation method is unsophisticated, and cannot be considered as a particularly enjoyable method of operation.

The information processing device according to a first aspect of the present invention is an information processing device comprising: a blank area storage unit able to store one or more items of blank area information having blank area position information that relates to the position of a blank area; an object storage unit able to store one or more objects; an output unit for outputting one or more blank areas corresponding to one or more items of blank area information, and one or more objects; a receiving unit for receiving a move command with respect to an object; a mover unit for moving the object that corresponds to the move command, in response to a move command received by the receiving unit; a decision unit that decides whether the position of an object moved by the mover unit exists in a predetermined positional relationship with respect to a blank area; and an execution unit for, in cases where the decision unit decides that the predetermined positional relationship exists, executing an action that corresponds to the blank area or moved object.

By means of the first aspect according to the invention, a prescribed action can be executed through an enjoyable operation.

The information processing device according to a second aspect of the present invention is an information processing device according to the first aspect, further comprising an action information storage unit able to store one or more sets of action information providing information that relates to an action corresponding to a blank area, to an object, or to a blank area and an object; and in cases where the decision unit decides that the predetermined positional relationship exists, the execution unit acquires from the action information storage unit action information that corresponds to the blank area, to the moved object, or to the blank area and the moved object, and executes an action that corresponds to the blank area, to the moved object, or to the blank area and the moved object using the action information.

By means of the second aspect according to the invention, a prescribed action can be executed through an enjoyable operation.

The information processing device according to a third aspect of the present invention is an information processing device according to the first or second aspect, further comprising a route information storage unit able to store route information indicating a route over which an object is to be moved; the decision unit additionally decides whether a movement route of an object moved by the mover unit satisfies a route indicated by the route information; and in cases where the decision unit decides that a route indicated by the route information is satisfied, and that a predetermined positional relationship exists, the execution unit executes an action that corresponds to the blank area or to the moved object.

By means of the third aspect of the invention, a prescribed action can be executed through a more enjoyable operation.

The information processing device according to a fourth aspect of the present invention is an information processing device according to the third aspect, wherein the output unit outputs a route in such a way that a route indicated by route information is visually recognizable.

By means of the fourth aspect of the invention, a prescribed action can be executed through a more enjoyable operation.

The information processing device according to a fifth aspect of the present invention is an information processing device according to any of the first to fourth aspects, further equipped with a partial image storage unit able to store partial images which are images having one or more blank areas therein; the shape of one or more objects matching the shape of any one or more blank areas; and a single full image being constituted by the one or more objects arranged in any one or more blank areas, and a partial image.

By means of the fifth aspect of the invention, a prescribed action can be executed through an enjoyable operation.

The information processing device according to a sixth aspect of the present invention is an information processing device according to the fifth aspect, wherein the single full image is an advertisement.

By means of the sixth aspect of the invention, a prescribed action can be executed by viewing an advertisement to completion.

The information processing device according to a seventh aspect of the present invention is an information processing device according to any of the first to sixth aspects, further comprising a full image storage unit able to store a single full image; and a puzzle generation unit that cuts out a part of a full image, and acquires puzzle information that includes one or more objects that are cut-out sections, a partial image from which one or more objects have been cut out, and blank area information containing information about a blank area that is a cut-out area.

By means of the seventh aspect of the invention, a puzzle that affords an enjoyable operation can be generated automatically.

The information processing device according to an eighth aspect of the present invention is an information processing device according to any of the second to seventh aspects, further comprising: a puzzle receiving unit for receiving puzzle information from a puzzle generation server, the server being equipped with a full image storage unit able to store single full images, a puzzle generation unit that cuts out a part of a full image, and acquires puzzle information that includes one or more objects that are cut-out sections, a partial image from which one or more of the objects has been cut out, and blank area information which provides information about a blank area that is a cut-out area, and a puzzle transmission unit for transmitting puzzle information acquired by the puzzle generation unit; and a puzzle collection unit for collecting in an object storage unit one or more objects that are included in the puzzle information received by the puzzle receiving unit, collecting in a partial image storage unit partial images that are included in the puzzle information received by the puzzle receiving unit, and collecting in a blank area storage unit blank area information that is included in the puzzle information received by the puzzle receiving unit.

By means of the eighth aspect of the invention, a puzzle that affords an enjoyable operation can be generated automatically, and the load on the information processing device can be reduced.

The information processing device according to a ninth aspect of the present invention is an information processing device according to any of the first to eighth aspects, wherein there are two or more blank areas re; a single object is arrangeable in two or more blank areas; and the execution unit executes a different action depending on which the blank area the single object is arranged in.

By means of the ninth aspect of the invention, a prescribed action can be executed with a high degree of freedom, through a more enjoyable operation.

The information processing device according to a tenth aspect of the present invention is an information processing device according to any of the first to ninth aspects, wherein two or more objects are arrangeable in a single blank area; and the execution unit executes a different action depending on which object is arranged in a single blank area.

By means of the tenth aspect of the invention, a prescribed action can be executed with a high degree of freedom, through a more enjoyable operation.

The information processing device according to one aspect of the present invention comprises: an output unit for outputting one or more blank areas corresponding to one or more items of blank area information, and one or more objects; a receiving unit for receiving a move command with respect to the object; a mover unit for moving the object in response to a move command received by the receiving unit; and an execution unit for, in cases where the position of an object moved by the mover unit exists in a predetermined positional relationship with respect to the blank area, executing an action that corresponds to the blank area or the moved object.

The information processing method according to one aspect of the present invention includes a step for outputting one or more blank areas corresponding to one or more items of blank area information, and one or more objects; a step for receiving a move command with respect to the object; a step for moving the object in response to the received move command; and a step for executing an action corresponding to the blank area or the moved object, in cases where the position of the moved object exists in a predetermined positional relationship with respect to the blank area.

The computer program according to one aspect of the present invention prompts a computer to function as an output unit for outputting one or more blank areas corresponding to one or more items of blank area information, and one or more objects; a receiving unit for receiving a move command with respect to the object; a mover unit for moving the object in response to a move command received by the receiving unit; and an execution unit for, in cases where the position of an object moved by the mover unit exists in a predetermined positional relationship with respect to the blank area, executing an action that corresponds to the blank area or the moved object.

According to the various embodiments of the present invention, prescribed actions can be executed through enjoyable operations.

BRIEF DESCRIPTION OF THE DRAWINGS

FIG. 6 is a diagram showing a puzzle generation source information management table.

FIG. 11 is a diagram showing an action information management table.

FIG. 13 is a diagram showing an action information management table.

FIG. 15 is a diagram showing an action information management table.

DETAILED DESCRIPTION

Embodiments of an information processing device and the like will be described below with reference to the drawings. Constituent elements assigned like symbols in the embodiments perform like actions, and therefore in some instances the description may be omitted where redundant.

First Embodiment

The present embodiment describes an information processing device that performs a predetermined action, in cases where one or more objects have been moved to a prescribed vacant area (hereinafter termed a "blank area") on a screen.

The present embodiment moreover describes an information processing device in which, using route information that relates to a route on which an object is moved, a predetermined action is carried out on the condition that the object is moved along the route indicated by the route information in question.

The present embodiment moreover describes an information processing device that constructs an entire single screen (hereinafter called a "full image") in cases where an object is moved to a blank area.

The present embodiment additionally describes a process for generating a partial image and one or more objects from a full image.

The present embodiment additionally describes an information processing device in which there are two or more blank areas, and actions differ depending on the blank area in which an object is arranged.

The present embodiment additionally describes an information processing device in which the action differs depending on the object arranged in a single given blank area.

Figure 1:
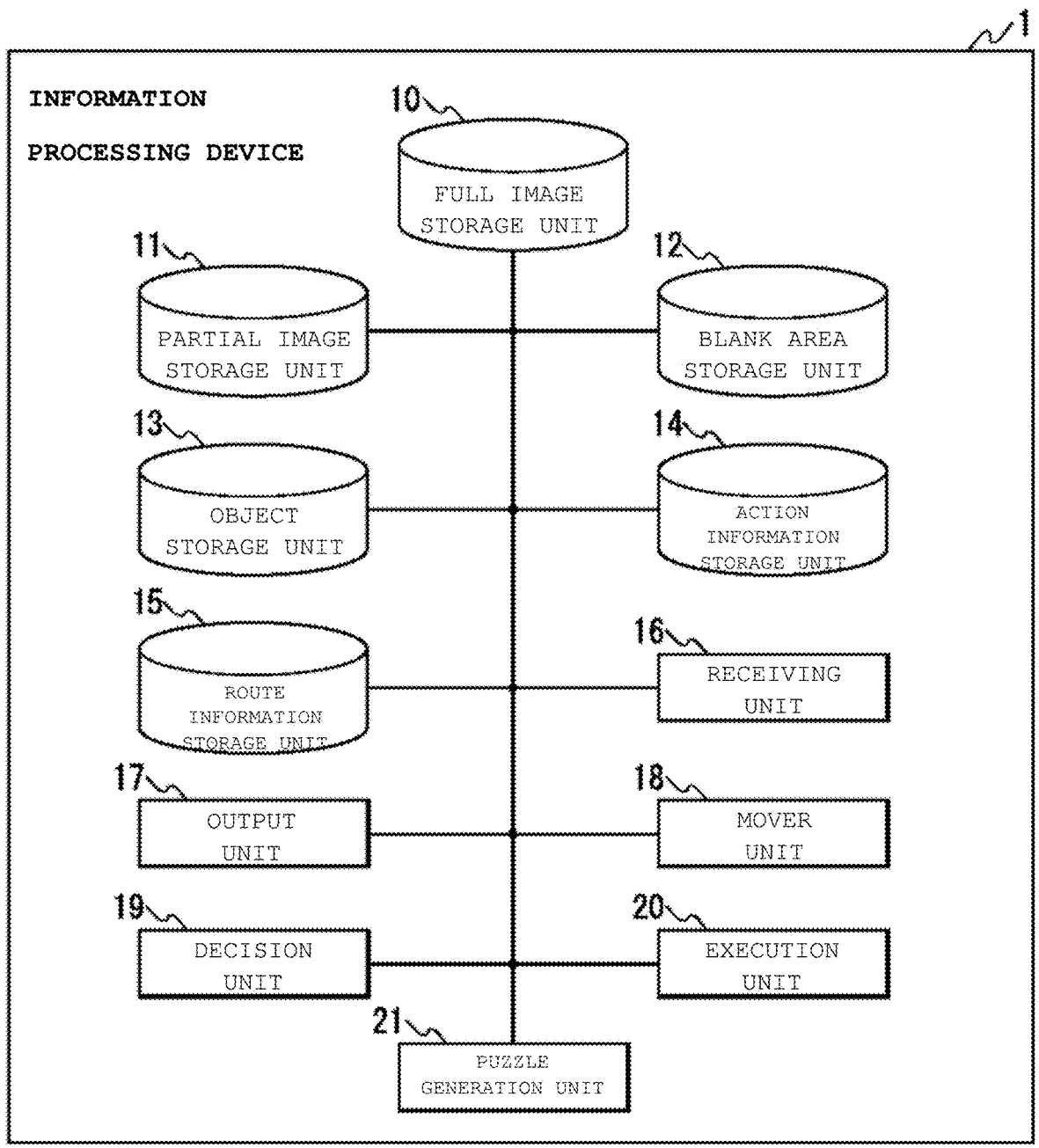
FIG. 1 is a first block diagram of an information processing device 1 in a first embodiment.

FIG. 1 is a first block diagram of an information processing device 1 in the present embodiment. The information processing device 1 is preferably an information terminal having a touch panel, such as tablet terminal, smartphone, or the like, but may also be an information terminal such as a PC, mobile telephone, or the like.

The information processing device 1 is provided with a full image storage unit 10, a partial image storage unit 11, a blank area storage unit 12, an object storage unit 13, an action information storage unit 14, a route information storage unit 15, a receiving unit 16, an output unit 17, a mover unit 18, a decision unit 19, an execution unit 20, and a puzzle generation unit 21.

The full image storage unit 10 is able to store single full images. A full image is preferably a screen having some sort of recognizable meaning to the user, such as an advertisement; however, the particular content of the full image is irrelevant.

The partial image storage unit 11 is able to store partial images, i.e., images that contain one or more blank areas. A partial image refers to an image resulting from exclusion of one or more blank areas from a full image. A blank area is an area in which an object may be arranged. Usually, a blank area is an area that is discontinuous, as a design, with respect to the background image, which is an image of the area other than the blank area. The blank area could be, for example, one of a solid single color. However, blank areas may represent patterns or the like. A blank area may be an area bounded by broken lines, solid lines, or the like, or a transparent area. In this case, the blank area will be an area that makes up part of a background image, and as a design may be considered as being continuous with the background image.

The blank area storage means 12 is able to store one or more items of blank area information. Blank area information contains blank area position information, which is information that relates to the position of a blank area within a partial image. Blank area information preferably contains an empty area identifier that identifies the blank area. Blank area position information is information that designates a blank area, and normally includes one or more items of coordinate information. Blank area position information may be, for example, information indicating the contours of the blank area; is shall be apparent that the data structure thereof is of no consequence. Blank area information included in blank area information may be modified dynamically by a blank area modification unit, not shown, or by the execution unit 20. Modification of blank area information usually refers to modification of the blank area position information, but modification of information about the shape of the blank area or the like is also acceptable. Modification of blank area information is carried out, for example, when a predetermined condition has been met. The predetermined condition may refer to execution of some action by the execution unit 20, to execution of a specific action by the execution unit 20, to execution of some action by the execution unit 20 for a number of times equal to or greater than a threshold value, or to execution of a specific action by the execution unit 20 for a number of times equal to or greater than a threshold value. The trigger or condition for modification of blank area information is of no consequence.

The object storage unit 13 is able to store one or more objects. An object refers to moveable information, for example, to an image. An object is usually a partial image that makes up part of a full image. That is, usually, a partial image and one or more objects make up a puzzle. The objects are usually the pieces of a puzzle.

The action information storage unit 14 is able to store one or more sets of action information. Action information refers to information that relates to an action, and usually contains executable information. Executable information refers to information necessary for execution of an action, for example, an action identifier that identifies an action (e.g., a function name, method name, message name, or the like), or an execution module, function, method, or other program, or the like. Action information may contain, for example, a blank area identifier that identifies a blank area, and executable information. Or, action information may contain, for example, an object identifier that identifies an object, and executable information. Alternatively, action information may contain, for example, a blank area identifier, an object identifier, and executable information. That is, executable information is information that corresponds to a blank area or an object, or to a blank area and an object.

The route information storage unit 15 is able to store one or more items of route information. Route information refers to information that indicates a route over which an object is to move. Route information is a set of position information, for example. Position information refers to coordinate information (x, y) on a window or partial screen. Route information may contain, for example, an object identifier identifying an object that is to move over the route indicated by the route information.

The receiving unit 16 receives commands, information, and the like from a user. "Command" refers here, for example, to a move command with regard to an object. A move command is a command to move the object, and is inputted, for example, on the basis of a touch input to touch panel, dragging of a mouse or the like, or a signal from an acceleration sensor or the like. A move command may also be a command using a keyboard or the like, or a command to move an object. A move command usually contains an object identifier that identifies an object targeted to be moved. A command could also be a puzzle output command, for example. A puzzle output command is a command to output a partial image from the partial image storage unit 11 and one or more objects from the object storage unit 13. A command could also generate a puzzle command, for example. A generate puzzle command refers to a process for generating puzzle information, discussed below, from a full image. Movement of an object by the receiving unit 16 on the basis of a signal from an acceleration sensor refers, for example, to a situation in which, when the information processing device 1 is tilted by the user, the object moves in the direction of tilt (the direction of the lowered side of the information processing device 1).

"Reception" refers here to reception of information input from an input device such as a mouse, touch panel, keyboard, or the like, and the concept includes reception of information transmitted via a wired or wireless communication line, or reception of information read out from an optical disk or magnetic disk, a semiconductor memory, or other such recording medium.

Acceptable input means for commands, information, and the like may be any of those relying on a touch panel, mouse, keyboard, menu screen, or the like. The receiving means 16 may be realized through a device driver of a keyboard or other input means, or through menu screen control software or the like.

The output unit 17 outputs one or more blank areas corresponding to one or more items of blank area information, and one or more objects. The output unit 17 may also be thought of as outputting a partial image and one or more objects. The output unit 17 preferably outputs a route within a partial image, in such a way that the route indicated by the route information is visually recognizable. An image that has a route may be thought of as being a partial image. Usually, the output unit 17 outputs an object to be moved when the mover unit 18 is moving the object. Here, output of a blank area refers to output in a form such that the contours of the blank area can be discerned. Output of a blank area may refer to output of the contours of the blank area, or to output of a background that surrounds the blank area. The route output by the output unit 17 is indicated, for example, by broken lines, solid lines, or the like within a partial image. Further, in cases where the receiving unit 16 has received a puzzle output command, the output unit 17 will preferably output a partial image from the partial image storage unit 11 and one or more objects from the object storage unit 13.

"Output" refers here to display on a display, projection by a projector, transmission to an external device (a display device or the like), or handover of the process result to another processing device, another program, or the like.

In response to a move command received by the receiving unit 16, the mover unit 18 moves the object that corresponds to the move command. The object that corresponds to the move command is, for example, an object dragged by a finger or by a mouse. Additionally, in response to a move command received by the receiving unit 16, the mover unit 18 may, for example, continuously acquire position information during motion of the object, and transfer the position information to the output unit 17. The output unit 17 then uses the transferred information to output motion of the object.

The decision unit 19 decides whether the position of an object that has been moved by the mover unit 18 is in a predetermined positional relationship with respect to a blank area. More specifically, the decision unit 19 decides whether an object moved by the mover unit 18 has been arranged in a blank area. In this instance, "arrangement" does not refer to a state in which the object has been arranged in the blank area such that not even a single dot deviates; rather, it is preferable for the decision unit 19, when deciding whether an object has been arranged in a blank area, to allow for a predetermined range of misalignment. The position of an object that was moved by the mover unit 18 appropriately refers to the position of the object in question at the point in time that motion was decided to have finished; however, the position of the object during motion is also acceptable. The state in which the object an object is deemed to be arranged in a blank area may also refer to a state in which the object is arranged in the blank area, and remained in a stationary state therein for a duration longer than a threshold value. The process by which the position of an object is decided to be within a predetermined positional relationship with respect to a blank area may be appropriately called an "arrangement decision process."

The decision unit 19 preferably performs a route decision process as well. A route decision process refers to a process for deciding whether a route of movement of an object moved by the mover unit 18 satisfies a route indicated by route information. In this case, the decision unit 19 will usually decide whether the movement route of an object moved by the mover unit 18 represents movement along a route indicated by route information, and additionally whether the position of the object exists in a predetermined positional relationship with respect to the blank area. It is preferable for the decision unit 19 to decide that the movement route of an object satisfies a route indicated by route information, even in cases where misalignment not exceeding a threshold value has occurred with respect to the route indicated by the route information.

In cases where the decision unit 19 has decided that [an object] is in a predetermined positional relationship, the execution unit 20 executes an action that corresponds to the blank area to which the object was moved, or to the moved object.

For example, in specific terms, in cases of a decision by the decision unit 19 that a predetermined positional relationship exists, the execution unit 20 acquires from the action information storage unit 14 action information that corresponds to a blank area or a moved object, or to a blank area and a moved object, and using the action information, executes an action that corresponds to the blank area or the moved object, or to the blank area and the moved object.

In cases of a decision by the decision unit 19 that a route indicated by route information is satisfied, and that a predetermined positional relationship exists, it is also acceptable for the execution unit 20 to execute an action that corresponds to the blank area or moved object.

The execution unit 20 will preferably execute different actions, when a given single object is arranged in different blank areas. In this instance, executable information is usually managed in association with blank areas, in the action operation storage unit 14. However, executable information may be managed in relation to sets of objects and blank areas. Here, a given single object refers to one which it is possible to arrange in two or more blank areas.

Further, the execution unit 20 will preferably execute different actions, when different objects are arranged within a given single blank area. In this instance, executable information is usually managed in association with objects, in the action operation storage unit 14. However, executable information may be managed in relation to sets of objects and blank areas. Here, it is assumed that it is possible to arrange two or more objects in a given single blank area.

Herein, an action may refer to acquisition of a Web page, execution of a function such as an information search, execution of a particular application, and the like.

The puzzle generation unit 21 acquires puzzle information. Puzzle information contains one or more objects, a partial image, and blank area information. The puzzle generation unit 21 reads out a full image from the full image storage unit 10, cuts out a portion of the full image in question, and acquires puzzle information that contains one or more objects which are cut-out sections, a partial image from which one or more objects has been cut out, and blank area information composed of information about a blank area which is an area where an object has been cut out. Here, the puzzle generation unit 21 may cut out graphics of predetermined shape, cut out graphics of shapes selected at random from among a plurality of shapes, or the like. That is, the specific method of acquiring graphics is of no particular concern. Herein, a graphic refers to an object. In cases where the receiving unit 16 has received a generate puzzle command, the puzzle generation unit 21 will preferably acquire puzzle information from a full image. Further, the puzzle generation unit 21 will preferably store puzzle generation source information, for example. Puzzle generation source information is information that is associated, for example, with a full image, and contains executable information corresponding to the number in which objects are to be generated, or to an object or blank area. The puzzle generation source information may also contain, for example, a full image identifier that identifies a full image, and executable information corresponding to the number in which objects which are to be generated, or to an object or blank area. Usually, puzzle generation information will contain only executable information only for the number in which objects are to be generated. Puzzle generation information will preferably also contain information about areas where objects are to be cut out.

The full image storage unit 10, the partial image storage unit 11, the blank area storage unit 12, the object storage unit 13, the action information storage unit 14, and the route information storage unit 15 are preferably non-volatile storage media, but realization through volatile storage media is possible as well.

The specific procedure by which full images and the like are stored in the full image storage unit 10 and the like is of no particular concern. For example, full images and the like may be stored in the full image storage unit 10 through the agency of storage media, or full images and the like may be transmitted via a transmission line or the like may be stored in the full image storage unit 10; alternatively full images and the like may be input through the agency an input device may be stored in the full image storage unit 10.

The output unit 17 may be thought of as either including a display or other such output device, or not. The output unit 17 may be realized through driver software for an output device, through an output device and driver software for an output device, or the like.

The mover unit 18, the decision unit 19, the execution unit 20, and pulse generation unit 21 are usually realized through an MPU, memory, or the like. The processing routine of the mover unit 18 is usually realized through software, the software being stored in a ROM or other storage medium. However, realization through hardware (dedicated circuitry) is also acceptable.

Next, the action of the information processing device 1 will be described, using the flowchart of FIG. 2.

(Step S201) The receiving unit 16 decides whether a puzzle output command has been received. In the event that a puzzle output command has been received, the routine advances to Step S202, and in the event that a puzzle output command has not been received, advances to Step S204. The puzzle output command may contain information specifying a partial image or the like.

(Step 202) The output unit 17 reads out a partial image from the partial image storage unit 11. The output unit 17 also reads out one or more objects from the object storage unit 13. Here, in the event that the puzzle output command contains information specifying a partial image or the like, the output unit 17 reads out the partial image that corresponds to the specifying information in question, and one or more objects.

(Step S203) The output unit outputs the partial image that was read out in Step 202. The routine returns to Step S201.

(Step S204) The receiving unit 16 decides whether a move command has been received. In the event that a move command has been received, the routine advances to Step S205, and in the event that a move command has not been received, advances to Step S211.

(Step S205) In response to the move command received by the receiving unit 16, the mover unit 18 acquires the position information of the object targeted to be moved, and temporarily collects the information in a buffer, not shown. Position information is information indicating the position of the object, and may be composed of a single item of coordinate information, or two or more items of coordinate information. Temporary compiling in this instance is cumulative. That is, information indicating the trajectory of movement of the object targeted to be moved is stored in the buffer. Preferably, an object identifier of the object targeted to be moved and information indicating the trajectory of movement thereof are collected in associated form in the buffer.

(Step S206) The mover part 18 decides whether movement of the object is finished. In the event that moving of the object is finished, the routine advances to Step S207, and in the event that moving has not finished, returns to Step S205. The mover part 18 decides that moving of the object has finished in cases where, for example, it detects that dragging of the object has finished, or that the object has remained in the same position for a duration exceeding a threshold value.

(Step S207) The decision unit 19 decides whether the position of the object that was moved by the mover unit 18 is in a predetermined positional relationship with respect to a blank area. This process is termed a "decision process." The decision process will be described using the flowchart in FIGS. 3 and 4.

(Step S208) The execution unit 20 decides whether the result of the decision process of Step S207 is a result that meets a condition. In cases where the result is one that meets the condition, the routine advances to Step 209, or in cases where the result does not meet the condition, returns to Step S201.

(Step S209) The execution unit 20 acquires the object identifier of the object targeted to be moved, or the blank area identified of the blank area in which the object is arranged, or both the object identifier and the blank area identifier. From the action information storage unit 14, the execution unit 20 then acquires executable information corresponding to the acquired object identifier or to the blank area identifier, or to the object identifier and the blank area identifier.

(Step S210) Using the executable information obtained in Step S209, the execution unit 20 executes the action that corresponds to the executable information. The routine returns to Step S201.

(Step 211) The receiving unit 16 decides whether a generate puzzle command has been received. In the event that a generate puzzle command has been received, the routine advances to Step S212, and in the event that a generate puzzle command has not been received, returns to Step S201.

(Step S212) The puzzle generation unit 21 reads out a full image from the full image storage unit 10.

(Step S213) The puzzle generation unit 21 assigns a "1" to a counter i.

(Step S214) The puzzle generation unit 21 decides whether to generate an i-th object. Using puzzle generation source information for example, the puzzle generation unit 21 decides whether to generate the i-th object. In the event that an i-th object is to be generated, the routine advances to Step S215, and in the event that an i-th object is not to be generated, advances to Step S218.

(Step S215) The puzzle generation unit 21 cuts out the i-th object from a full image or from an object up to and including the (i−1)th object. For example, using information that includes puzzle generation source information, which information pertains to an area from which the object is to be cut out, the puzzle generation unit 21 cuts out the i-th object. The puzzle generation unit 21 will preferably generate an object identifier for the i-th object, and temporarily collect the identifier, in the form of pair with the i-th object, in the buffer.

(Step S216) The puzzle generation unit 21 acquires blank area information with respect to the i-th object. The puzzle generation unit 21 will preferably generate a blank area identifier as i-th blank area information, include the blank area identifier in the i-th blank area information, and temporarily collect the information in the buffer.

(Step S217) The puzzle generation unit 21 increments the counter by 1. The routine returns to Step S214.

(Step S218) From a full image, the puzzle generation unit 21 acquires a partial image, i.e., an image from which all of the objects have been cut out.

(Step S219) The puzzle generation unit 21 collects the partial image acquired in Step S218 in the partial image storage unit 11. The puzzle generation unit 21 collects into the blank area storage unit 12 the one or more items of blank area information that were acquired in Step S216. The puzzle generation unit 21 collects into the object storage unit 13 the one or more objects that were acquired in Step S215. Further, the puzzle generation unit 21 collects into the action information storage unit 14 action information that includes the executable information included in the puzzle generation source information. The puzzle generation unit 21 preferably uses the executable information, and the blank area identifier and/or the object identifier, to constitute the action information. The routine returns to Step S201.

Figure 2:
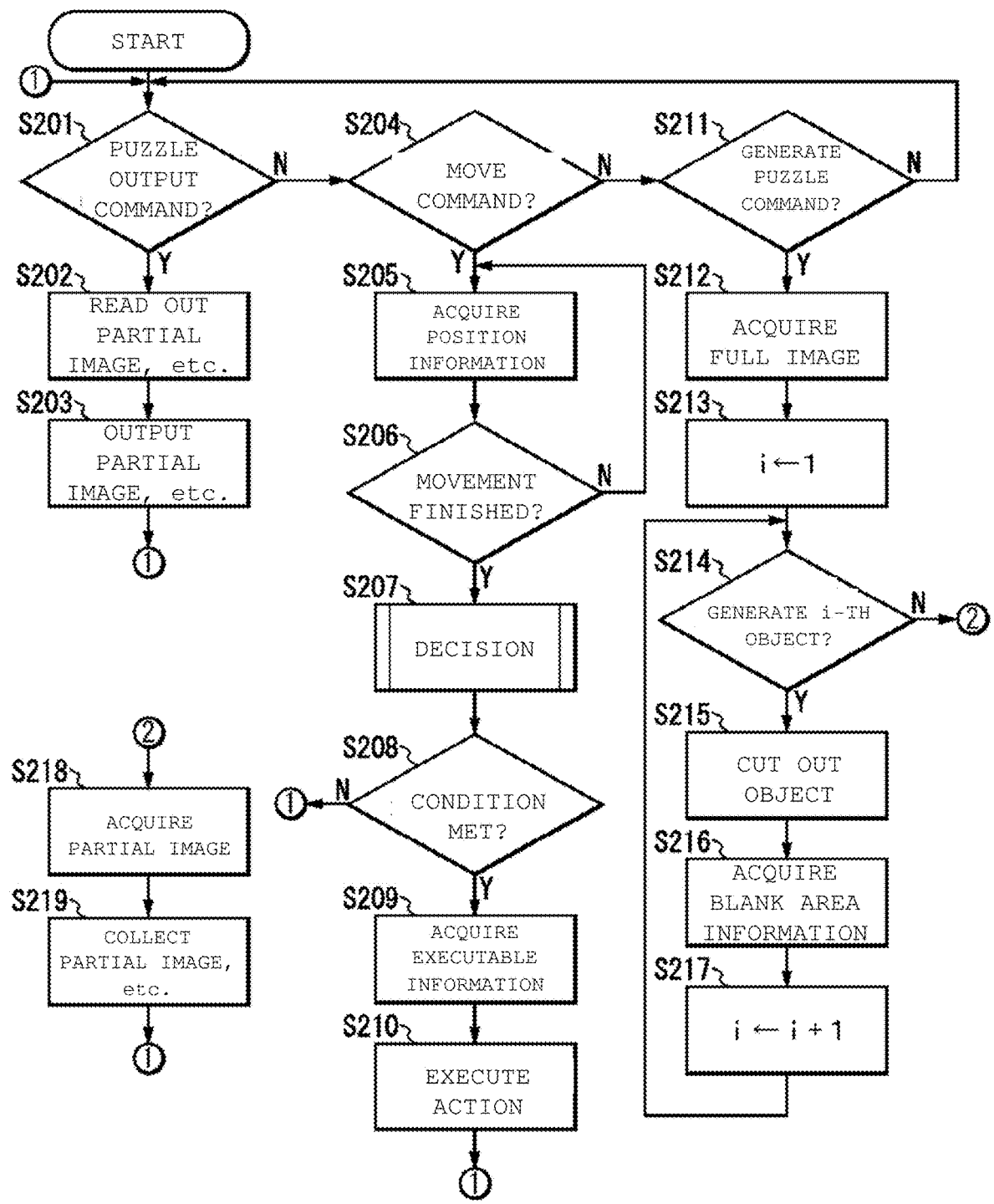
FIG. 2 is a flowchart describing actions of the information processing device 1.

In the flowchart of FIG. 2, the process is terminated by turning off the power, or through a process-terminating interrupt.

Figure 3:
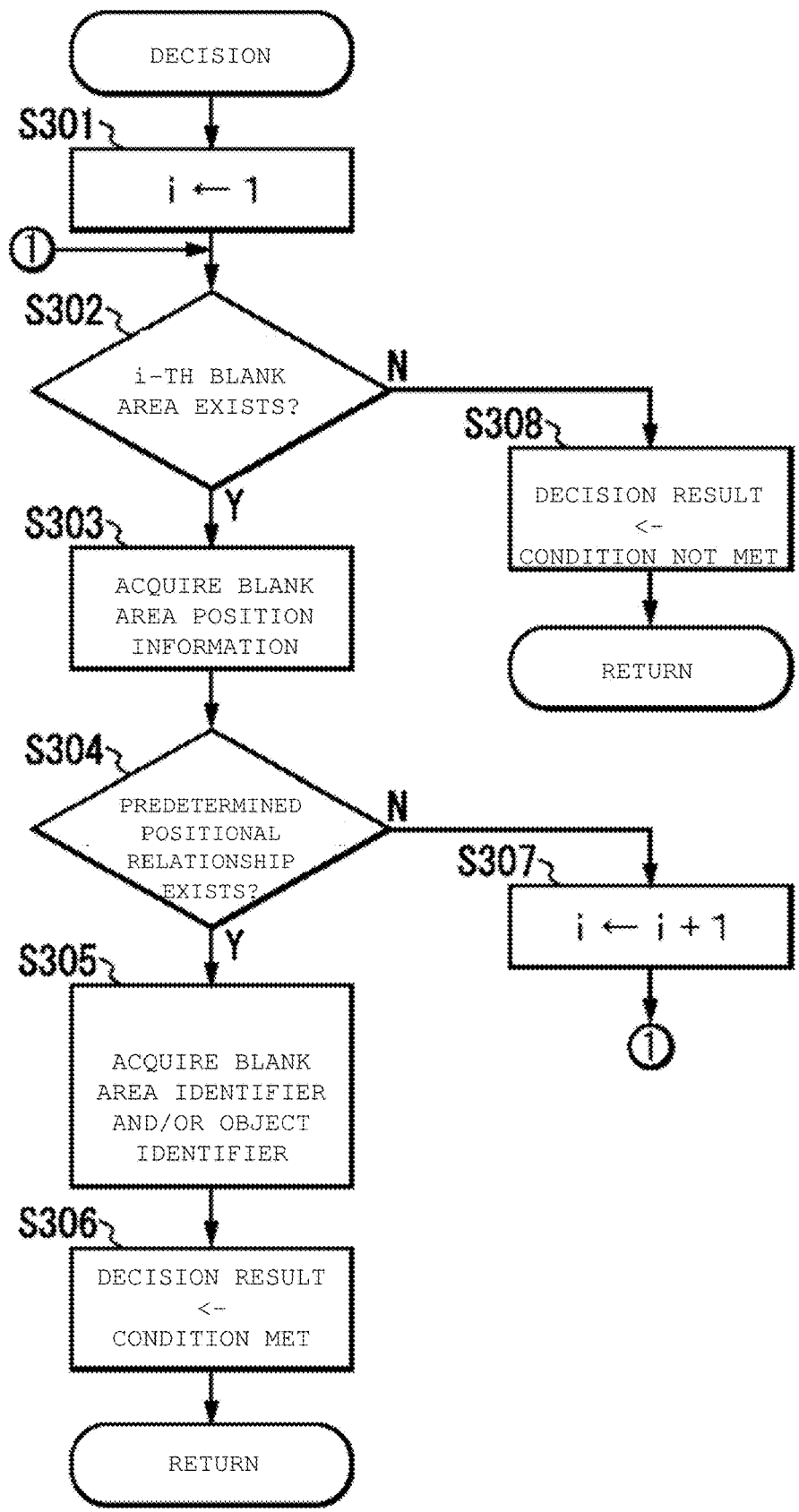
FIG. 3 is a flowchart describing the decision process.

Next, the decision process of Step S207 will be described, using the flowchart of FIG. 3. The decision process here is a first decision process. The first decision process represents a case in which the decision unit 19 carries out an arrangement decision process only.

(Step S301) The decision unit 19 assigns a "1" to a counter i.

(Step S302) The decision unit 19 decides whether an i-th blank area exists. The decision unit 19 may, for example, decide whether i-th blank area information exists in the blank area storage unit 12, or use a technique such as contour extraction of blank areas in the output partial image, to decide whether i-th blank area information exists. In the event that an i-th blank area exists, the routine advances to Step S303, and in the event that no i-th blank area exists, advances to Step S308.

(Step S303) From the blank area storage unit 12, the decision unit 19 acquires blank area position information corresponding to the i-th blank area.

(Step S304) Using at least the blank area position information corresponding to the i-th blank area and the latest position information acquired in Step S205, the decision unit 19 decides whether the position of the object targeted to be moved is in a predetermined positional relationship with respect to the blank area. In cases where [the object is] in the predetermined positional relationship, the routine advances to Step S305, and in cases when [the object is] not in the predetermined positional relationship, advances to Step S307.

(Step S305) The decision unit 19 acquires the blank area identifier corresponding to the i-th blank area, or the object identifier of the object targeted to be moved, or both the blank area identifier corresponding to the i-th blank area and the object identifier.

(Step S306) The decision unit 19 assigns information to the effect that the condition was met, to a "decision result" variable. The routine then returns to a higher level process.

(Step S307) The decision unit 19 increments the counter by 1. The routine returns to Step S302.

(Step S308) The decision unit 19 assigns information to the effect that the condition was not met, to a "decision result" variable. The routine then returns to a higher level process.

Next, the decision process of Step S207 will be described, using the flowchart of FIG. 4. The decision process in this instance is a second decision process. Description is omitted for steps in the flowchart of FIG. 4 that are identical to those in the flowchart of FIG. 3. The second decision process represents a case in which the decision unit 19 carries out an arrangement decision process and a route decision process.

(Step S401) The decision unit 19 acquires from the route information storage unit 15 the route information that corresponds to the blank area identifier corresponding to the i-th blank area.

(Step S402) The decision unit 19 acquires a history of the position information that was acquired in Step S205. Position information history refers to information that indicates the trajectory of motion of an object, and usually includes two or more items of position information.

(Step S403) The decision unit 19 assigns a "1" to a counter j.

(Step S404) The decision unit 19 decides whether a j-th item of position information exists in the position information acquired in Step S402. In the event that a j-th item of position information exists, the routine advances to Step S405, and in the event that no j-th item of position information exists, advances to Step S308.

(Step S405) The decision unit 19 decides whether the j-th item of position information exists on the route indicated by route information. In the event that [the information] exists on the route, the routine advances to Step S406, and in the event that [the information] does not exist on the route, advances to Step S409. Preferably, the decision unit 19 will decide that the j-th item of position information exists on a route, in instances in which the information deviates by less than a threshold value from the route indicated by the route information.

(Step S406) The decision unit 19 increments the counter j by 1.

(Step S407) The decision unit 19 decides whether the j-th item of position information exists within the position information that was acquired in Step S402. In the event that the j-th item of position information exists, the routine advances to Step S408, and in the event that the j-th item of position information does not exist, the routine advances to Step S306.

(Step S408) The decision unit 19 decides whether the j-th item of position information exists on the route indicated by route information. In cases where [the information] exists on the route, the routine returns to Step S406, and in cases where [the information] does not exist on the route, advances to Step S308.

(Step S409) The decision unit 19 increments the counter j by 1, and returns to Step S404.

Figure 4:
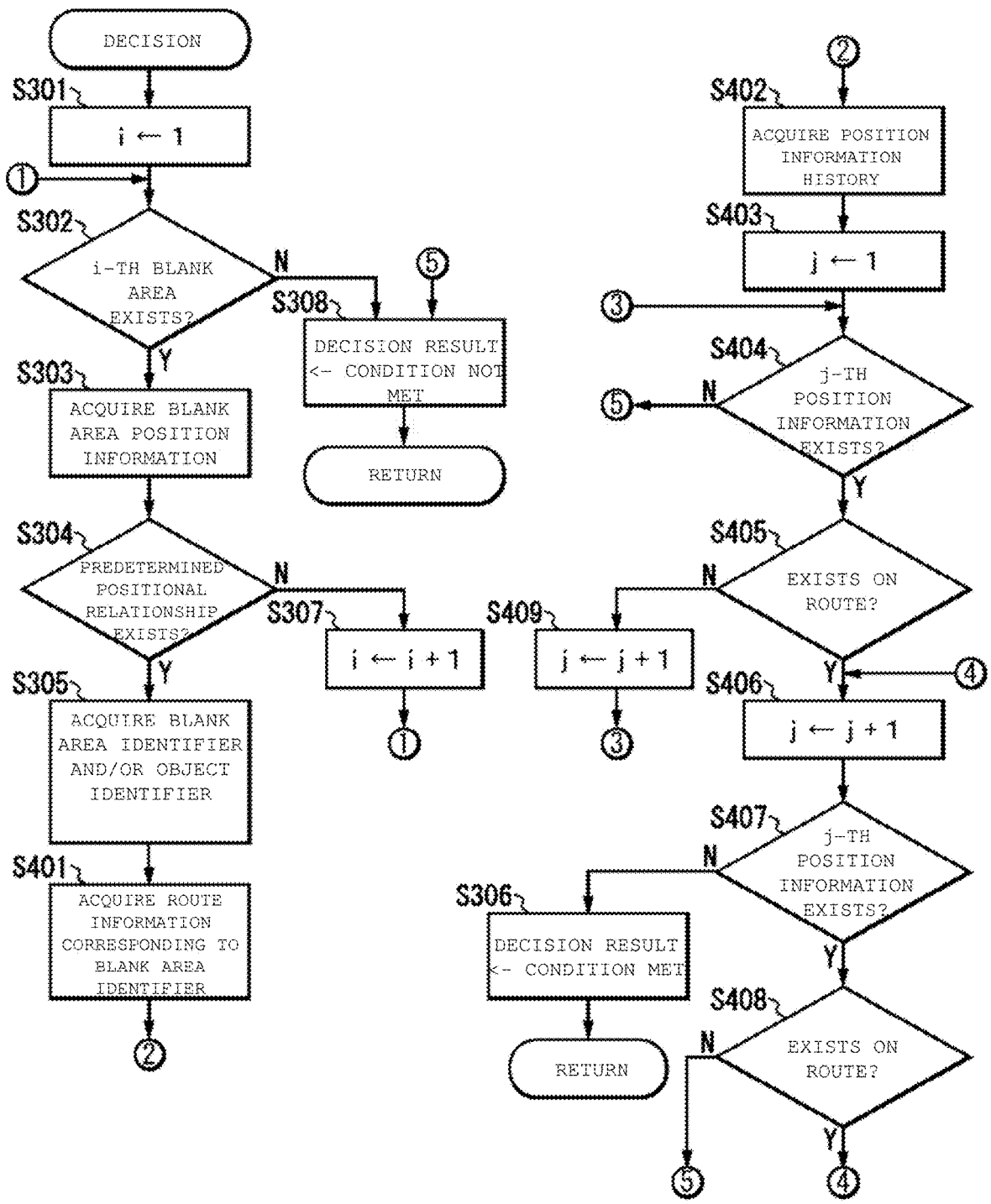
FIG. 4 is a flowchart describing the decision process.

In the flowchart of FIG. 4, the decision unit 19 carries out the route decision process through an algorithm for Steps S401 to S409. The route decision process in this instance is an algorithm in which the condition is decided to have been met, in cases where an object, having previously been in a state of divergence from the route, has once moved onto the route, and the object has continued on the route and moved until reaching a blank area.

However, the route decision process may be [accomplished] by some other algorithm instead. For example, it would be acceptable for the decision unit 19 to decide that the condition has been met, only in cases where [an object] has passed through all of the route indicated by the route information.

In the flowchart of FIG. 4, the route decision process takes place after the arrangement decision process. However, it would be acceptable for the route decision process to take place first.

A specific action of the information processing device 1 of the present embodiment will be described below. In this instance, the information processing device 1 is a smartphone, and has a touch panel.

Specific Example 1

Specific Example 1 describes a process by which the puzzle generation unit 21 generates puzzle information, using stored puzzle generation source information.

Figure 5:
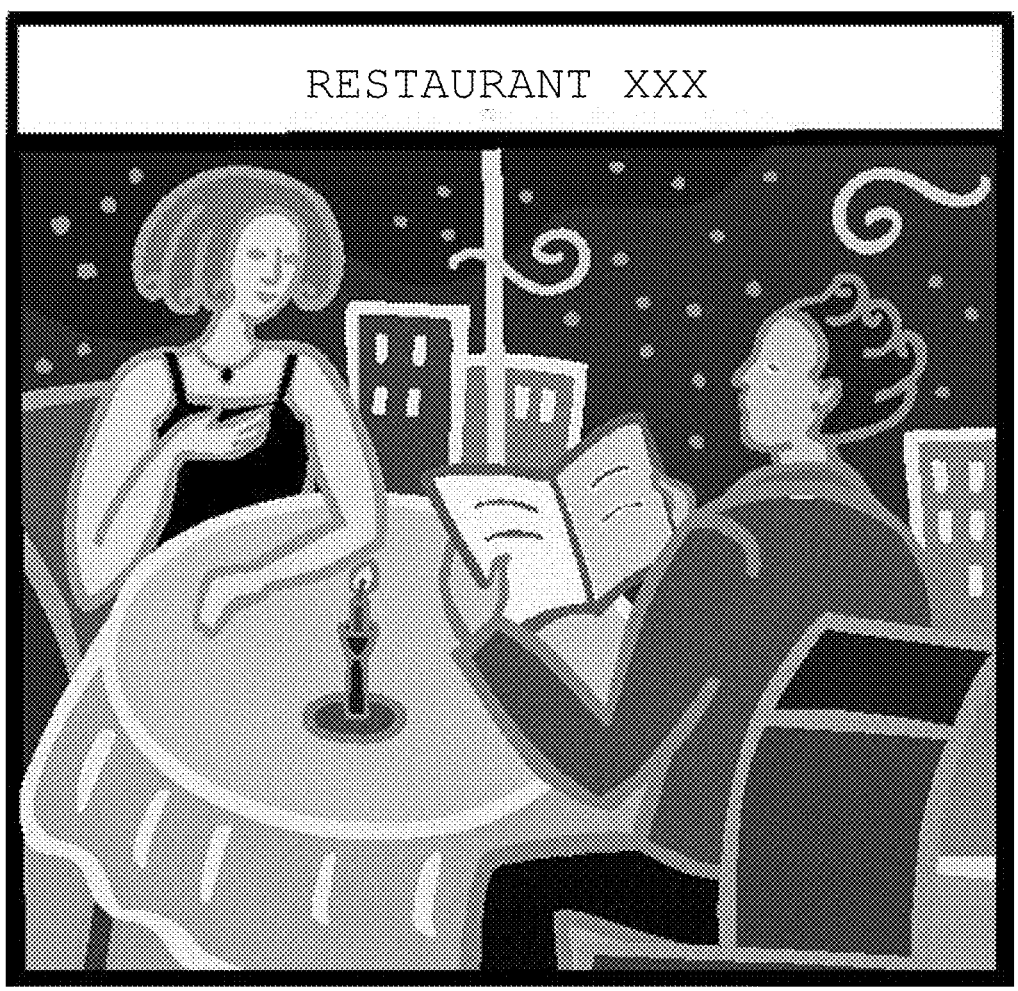
FIG. 5 is a diagram showing an example of a full image.

Let it be assumed that the full image shown in FIG. 5 is currently stored in the full image storage unit 10. The full image is an image of an advertisement for a restaurant XXX.

Moreover, let it be assumed that the puzzle generation source management table shown in FIG. 6 is currently stored in the puzzle generation unit 21. The puzzle generation source management table contains [the information] "ID," "Shape," "Size," "Position," and "Executable information." "ID" is information identifying a record. "Shape" indicates the shape of a cut-out object, "Size" indicates the size of a cut-out object, "Position" indicates a cutout position (in this case, the upper left coordinates of the object), and "Executable information" is information relating to an action to be executed when an object is arranged in a blank area, in this instance, the name of an execution module. The execution modules "ABC.exe" and "XYZ.exe" are stored in the action information storage unit 14.

Assume that, under these circumstances, a user has input a generate puzzle command to the information processing device 1. Thereupon, the receiving unit 16 receives the generate puzzle command.

Next, the puzzle generation unit 21 reads out the full image of FIG. 5 from the full image storage unit 10. Next, the puzzle generation unit 21 acquires the two items of puzzle generation source information in FIG. 6.

Then, using the "ID=1" puzzle generation source information in FIG. 6, the puzzle generation unit 21 cuts out a rectangular shape of a size (L1, H1) at a position (x1, y1). Likewise, using the "ID=2" puzzle generation source information in FIG. 6, the puzzle generation unit 21 cuts out a rectangular shape of a size (L2, H2) at a position (x2, y2). The puzzle generation unit 21 then acquires a partial image 71 and objects 72 and 73 in FIG. 7. The puzzle generation unit 21 also generates an object identifier "01" identifying the partial image 71, and an object identifier "02" identifying the partial image 72. The puzzle generation unit 21 generates the object identifiers by using the generation rule "O"+numeral.

The puzzle generation unit 21 also acquires two items of blank area information, "Blank area identifier: N1, blank area position information: (x1, y1) (x1+L1, y1+H1) and "Blank area identifier: N2, blank area position information: (x2, y2) (x2+L2, y2+H2)." The puzzle generation unit 21 generates the blank area identifiers by using the generation rule "N"+numeral.

Figure 7:
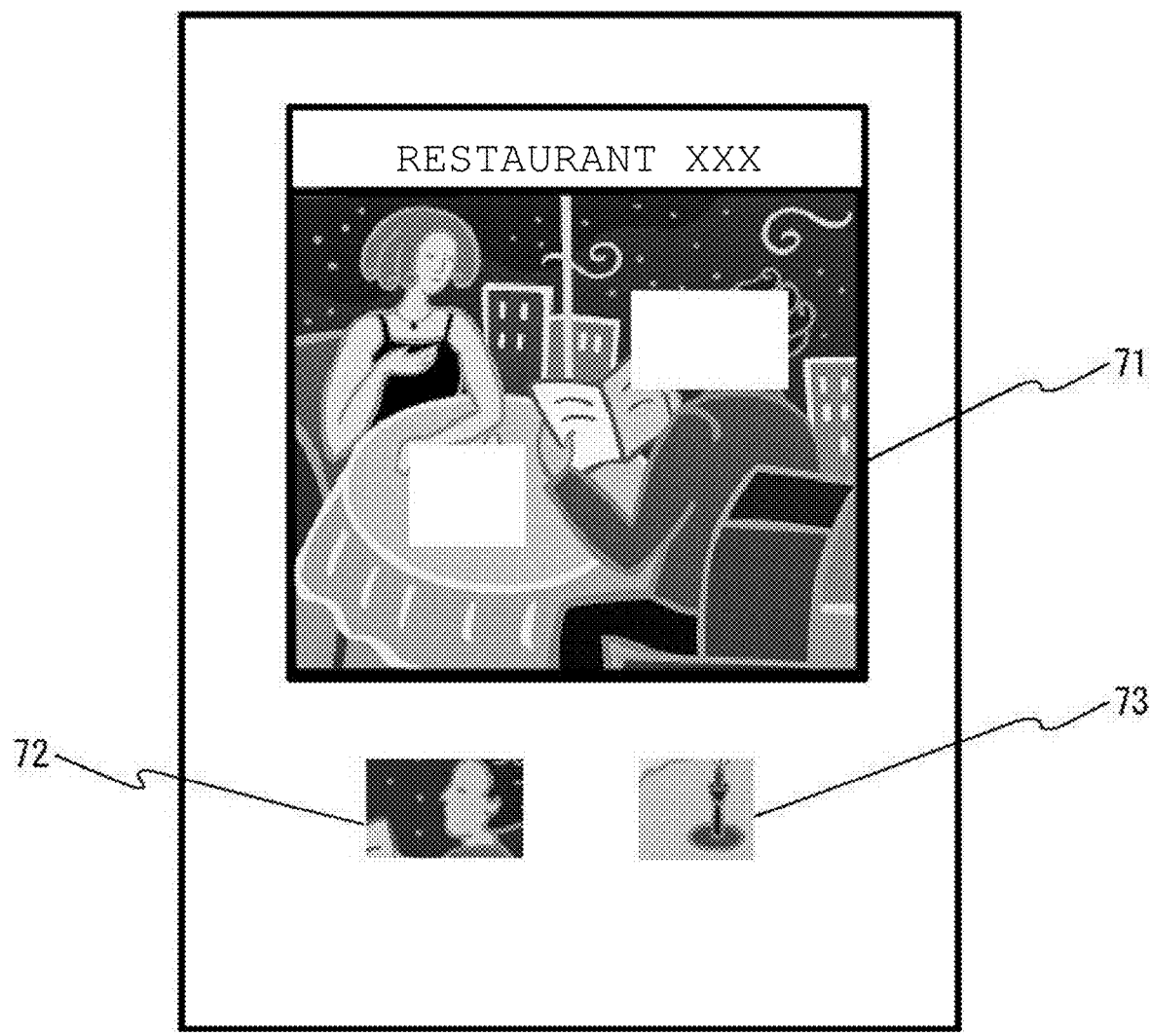
FIG. 7 is a diagram showing partial images.

Next, the puzzle generation unit 21 collects the partial image 71 of FIG. 7 into the partial image storage unit 11, collects the objects 72 and 73 and the object identifiers into the object storage unit 13, and collects the aforementioned two items of blank area information into the blank area storage unit 12.

The puzzle generation unit 21 also collects the two sets of action information "blank area identifier 'N1,' executable information 'ABC.exe'" and "blank area identifier 'N2,' executable information 'XYZ.exe'" into the blank area storage unit 14.

Through the above process, puzzle information is generated automatically. In Specific Example 1, it would of course be acceptable to cut out objects of any shape. Also, it would of course be acceptable to cut out any number of objects in Specific Example 1.

Specific Example 2

Specific Example 2 describes a process for executing an action in cases where objects have been arranged in two blank areas.

Let it be assumed that the process of Specific Example 1 has been completed, that is, that 71 of FIG. 7 is currently stored in the partial image storage unit 11. Two items of blank area information, "Blank area identifier: N1, blank area position information: (x1, y1) (x1+L1, y1+H1) and "Blank area identifier: N2, blank area position information: (x2, y2) (x2+L2, y2+H2)" are currently stored in the blank area storage unit 12. The object 72 and the object identifier for 72, and the object 73 and the object identifier for 73, are stored in the object storage unit 13. Further, the two sets of action information "blank area identifier 'N1,' executable information 'ABC.exe'" and "blank area identifier 'N2,' executable information 'XYZ.exe'" are collected in the blank area storage unit 14.

Assume that, under these circumstances, a user of the information processing device 1 has input a generate puzzle command to the information processing device 1. Thereupon, the receiving unit 16 receives the generate puzzle command.

Figure 8:
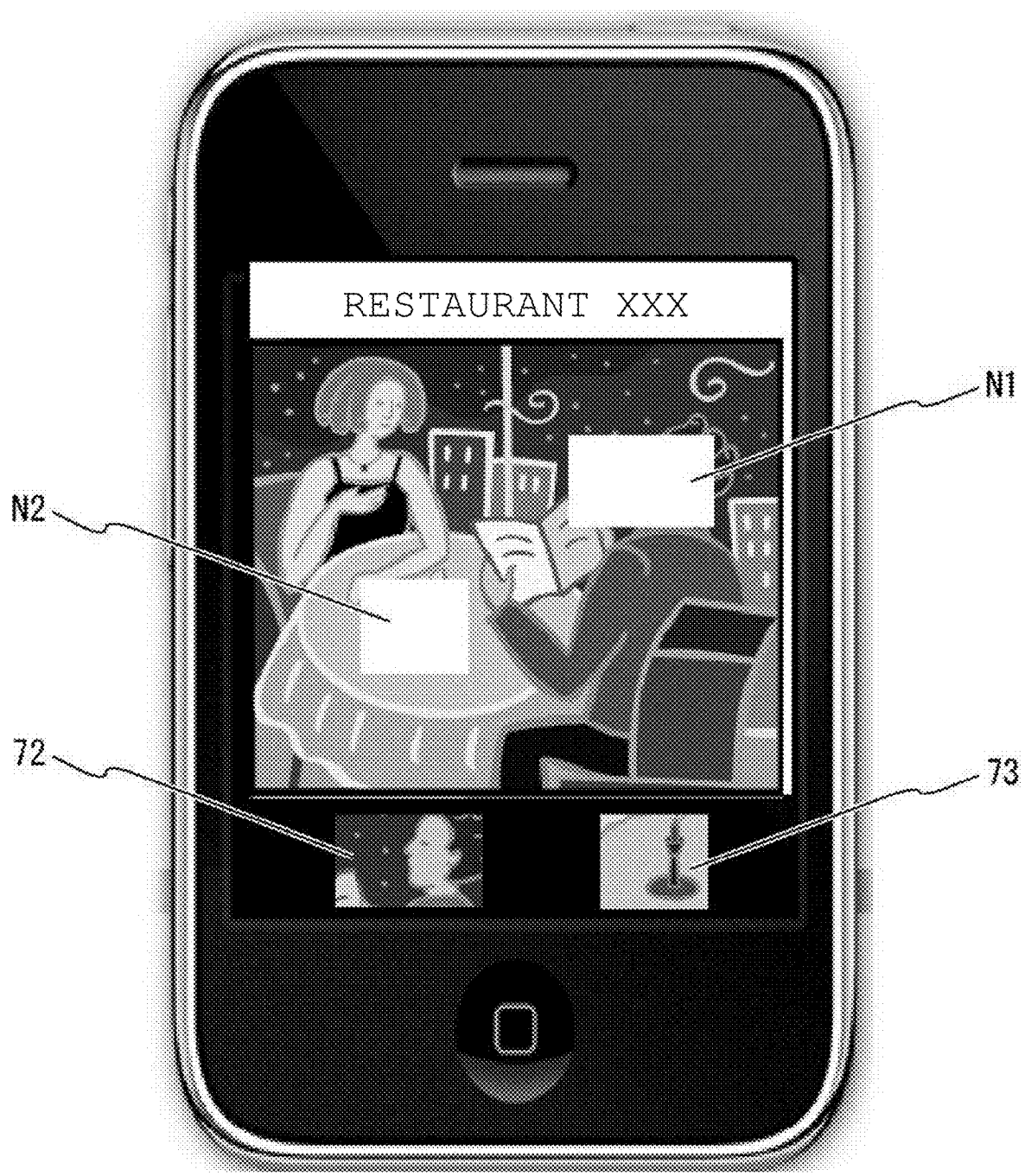
FIG. 8 is a diagram showing a screen example.

The output unit 17 then reads out the partial image 71 from the partial image storage unit 11. The output unit 17 reads out the objects 72 and 73 from the object storage unit 13. Then, the output unit 17 outputs the partial image 71 and the objects 72 and 73 as shown in FIG. 8.

Next, the user pins the object 72 under a finger and drags it, moving [the object] to a blank area N1. That is, the user inputs a move command to move the object 72 into the blank area N1. Thereupon, the receiving unit 16 receives the move command.

Then, in response to the move command received by the receiving unit 16, the mover unit 18 acquires position information of the object targeted to be moved. The mover unit 18 detects that there has been no change in the position information of the object 72 for a duration exceeding a threshold value, and decides that moving of the object 72 is finished.

Next, the decision unit 19 acquires position information $(x_{071}, y_{071})$ indicating the current position of the object 71. The decision unit 19 then acquires the blank area position information "(x1, y1) (x1+L1, y1+H1)" for the blank area N1 from the blank area storage unit 12. Here, $(x_{071}, y_{071})$ denote the coordinates of the centroid of the object 72, for example.

Next, using the position information $(x_{071}, y_{071})$ and the position information $(x_{071}, y_{071})$ in the area indicated by the blank area position information "(x1, y1) (x1+L1, y1+H1)," the decision unit 19 decides that the position indicated by the position information $(x_{071}, y_{071})$ for the object 72 targeted to be moved lies within the blank area. In this instance, being in a predetermined positional relationship refers to a situation in which the position indicated by the position information of the object 72 is within the blank area. Next, the decision unit 19 assigns information to the effect that the condition was met, to a "decision result" variable.

Next, the execution unit 20 acquires the executable information "ABC.exe" that is paired with the blank area identifier "N1." The execution unit 20 then executes "ABC.exe."

Next, let it be assumed that in like fashion the user has pinned the object 73 under a finger and dragged it, moving [the object] to a blank area N2. That is, the user has input a move command to move the object 73 into the blank area N2. Thereupon, the receiving unit 16 receives the move command.

A process analogous to that in the case of the object 72 is then carried out. The execution unit 20 then acquires the executable information "XYZ.exe" that is paired with the blank area identifier "N2." The execution unit 20 then executes "XYZ.exe."

Figure 9:
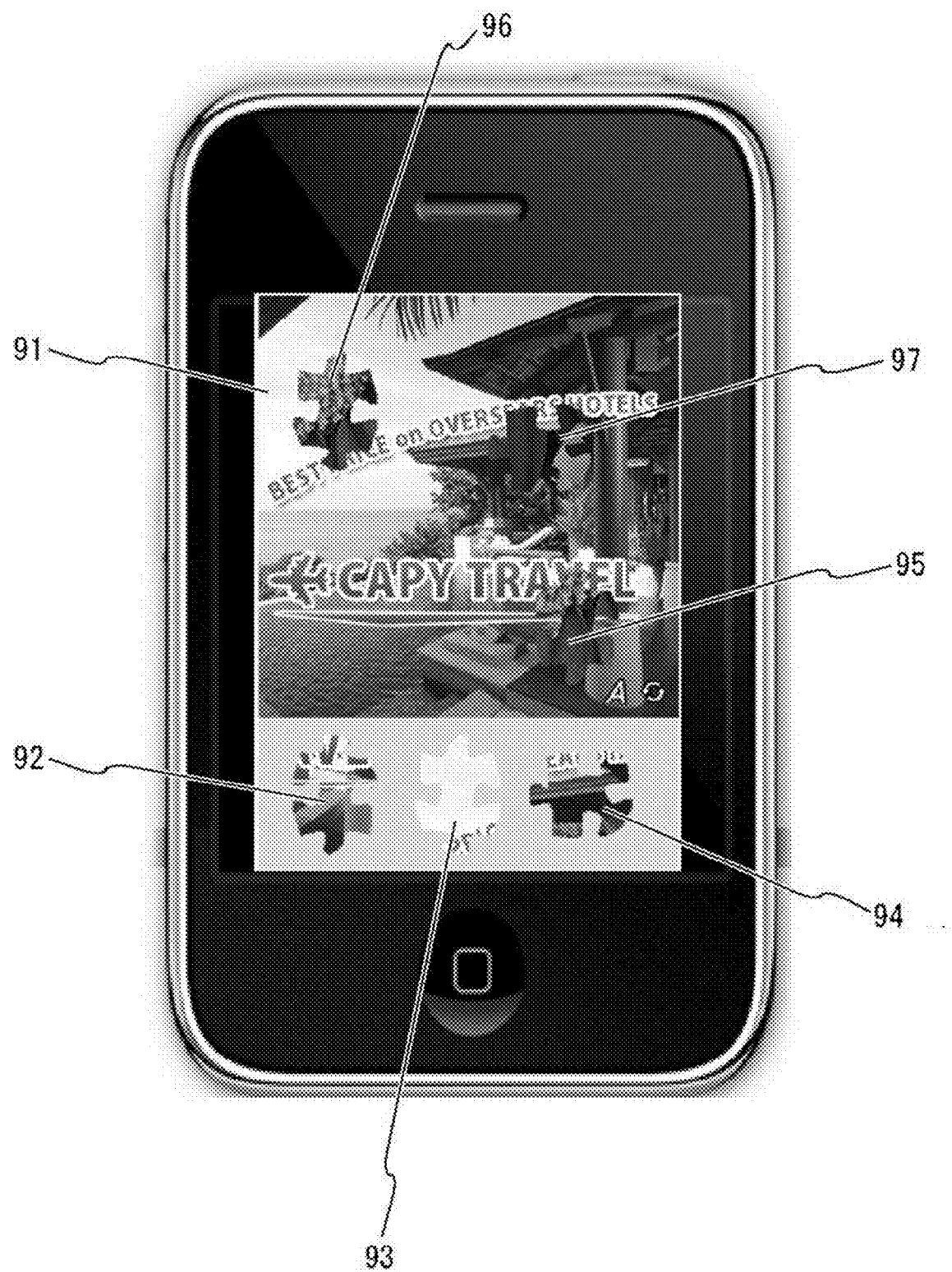
FIG. 9 is a diagram showing a screen example.

In Specific Example 2, in cases where objects have been arranged in each of two blank areas, actions in accordance with the blank areas are executed. However, it would also be acceptable for the decision unit 19 to decide that the condition has been met in the event that prescribed objects have been arranged in all of two or more blank areas, and for the execution unit to then execute a single action. For example, in FIG. 9, an advertisement for a travel company has been cut out at three locations. The information processing device 1 displays a partial image 91, objects 92-94, and blank areas 95-97. Preferably, when in this state, the decision unit 19 has detected that a user has dragged the object 92 with a finger and arranged it in the blank area 95, dragged the object 93 with a finger and arranged it in the blank area 96, and dragged the object 94 with a finger and arranged it in the blank area 97, the execution unit 20, using predetermined executable information, will execute a predetermined action.

Specific Example 3

Specific Example 3 describes a case in which two or more objects are able to be arranged in a single blank area, the action that executed being different depending on the object arranged therein.

Figure 10:
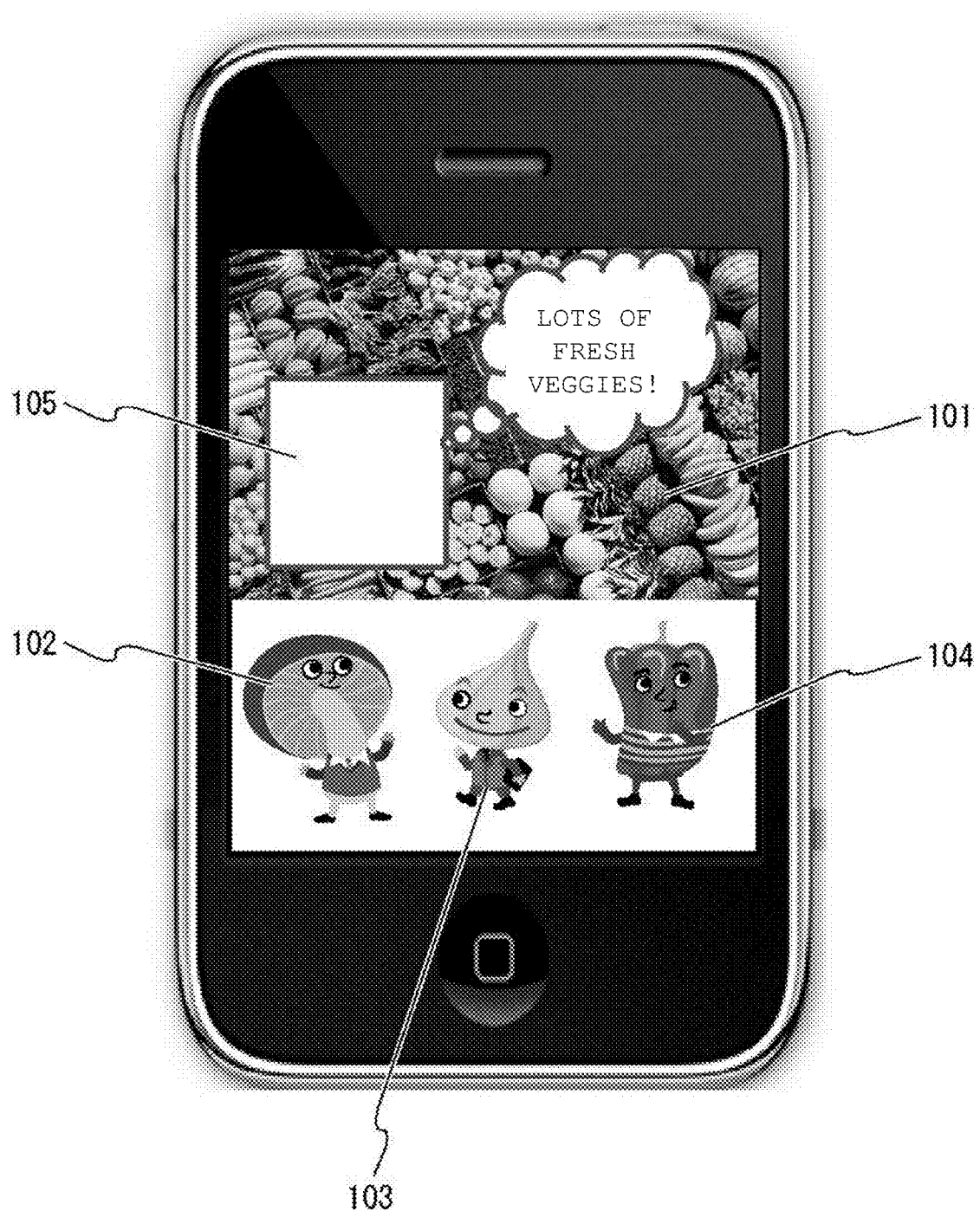
FIG. 10 is a diagram showing a screen example.

It is assumed that, as shown in FIG. 10, the information processing device 1 outputs a puzzle information (a screen) that includes a partial image 101, objects 102-104, and a blank area 105.

It is further assumed that the action information management table shown in FIG. 11 is stored in the action information storage unit 14. Three sets of action information are stored in the action information management table. Here, the action information includes [the items of] "ID," "object identifier," and "executable information." The "executable information" includes "action identifiers" and "arguments." The "ID" is information that identifies action information. The "object identifier" is the name of a function to be executed, and the "argument" is information presented to the function. The executable information "ID=1" in FIG. 11 presents arguments "message 1" and "add 1" to a function "sendmessage," and signifies to execute the function "sendmessage." The executable information "ID=2" in FIG. 11 presents an argument "URL2" to a function "retrieve," and signifies to execute the function "retrieve." The executable information items "ID=2," "ID=3" are functions for acquiring web pages having the URLs indicated by the arguments. Herein, "the action that is executed differs depending on the object arranged therein" is intended to also include cases in which information (arguments or the like) presented at the time of action differ.

Let it be assumed that, in this state, the user of the information processing device 1 has pinned the object 103 under a finger and dragged it, moving [the object] to the blank area 105. That is, the user has input a move command to move the object 103 to the blank area 105. Thereupon, the receiving unit 16 receives the move command.

A process analogous to that described in Specific Example 2 is then carried out. The decision unit 19 then assigns information to the effect that the condition was met, to a "decision result" variable.

Next, the execution unit 20 acquires the object identifier "103." The execution unit 20 then acquires from the action information management table shown in FIG. 11 the executable information "retrieve(URL2)" that is paired with the object identifier "103." The execution unit 20 then executes "retrieve(URL2)." The web page of URL2 is then displayed by the information processing device 1.

Specific Example 4

Specific Example 4 describes a case in which a single object is able to be arranged in a multiple blank areas, and different actions are executed depending on the blank area in which [the object] is arranged.

Figure 12:
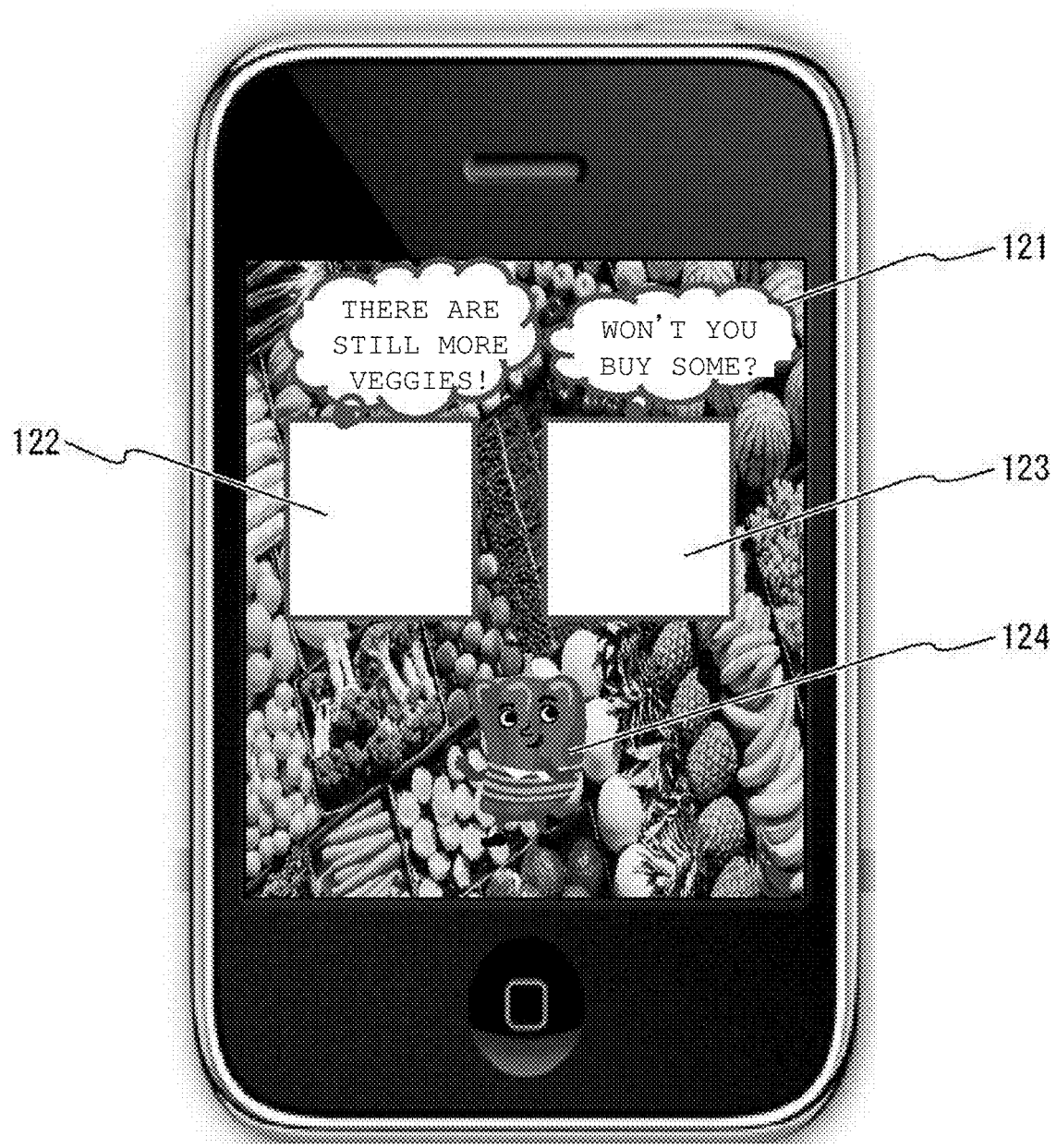
FIG. 12 is a diagram showing a screen example.

It is assumed that, as shown in FIG. 12, the information processing device 1 outputs a puzzle information (a screen) that includes a partial image 121, an object 104, and blank areas 122, 123.

The action information management table shown in FIG. 13 is stored in the action information storage unit 14. Two sets of action information are stored in the action information management table. In this instance, the action information includes [the items of] "ID," "blank area identifier," and "executable information."

Let it be assumed that, under these circumstances, the user of the information processing device 1 has pinned the object 104 under a finger and dragged it, moving [the object] to the blank area 122. That is, the user has input a move command to move the object 104 to the blank area 122. Thereupon, the receiving unit 16 receives the move command.

A process analogous to that described in Specific Example 2 is then carried out. The decision unit 19 then assigns information to the effect that the condition was met, to a "decision result" variable.

Next, the execution unit 20 acquires the object identifier "103." The execution unit 20 then acquires the blank area identifier "122" of the blank area in which the object identifier "104" has been arranged. Next, the execution unit 20 acquires from the action information management table shown in FIG. 13 the executable information "jump_nextpage" that is paired with the blank area identifier "122" of the blank area. The execution unit 20 then executes "jump_nextpage." Thereupon, the next page is displayed by the information processing device 1.

Specific Example 5

Specific Example 5 describes a case in which an action that is to be executed is decided from a combination of an object and blank area.

Figure 14:
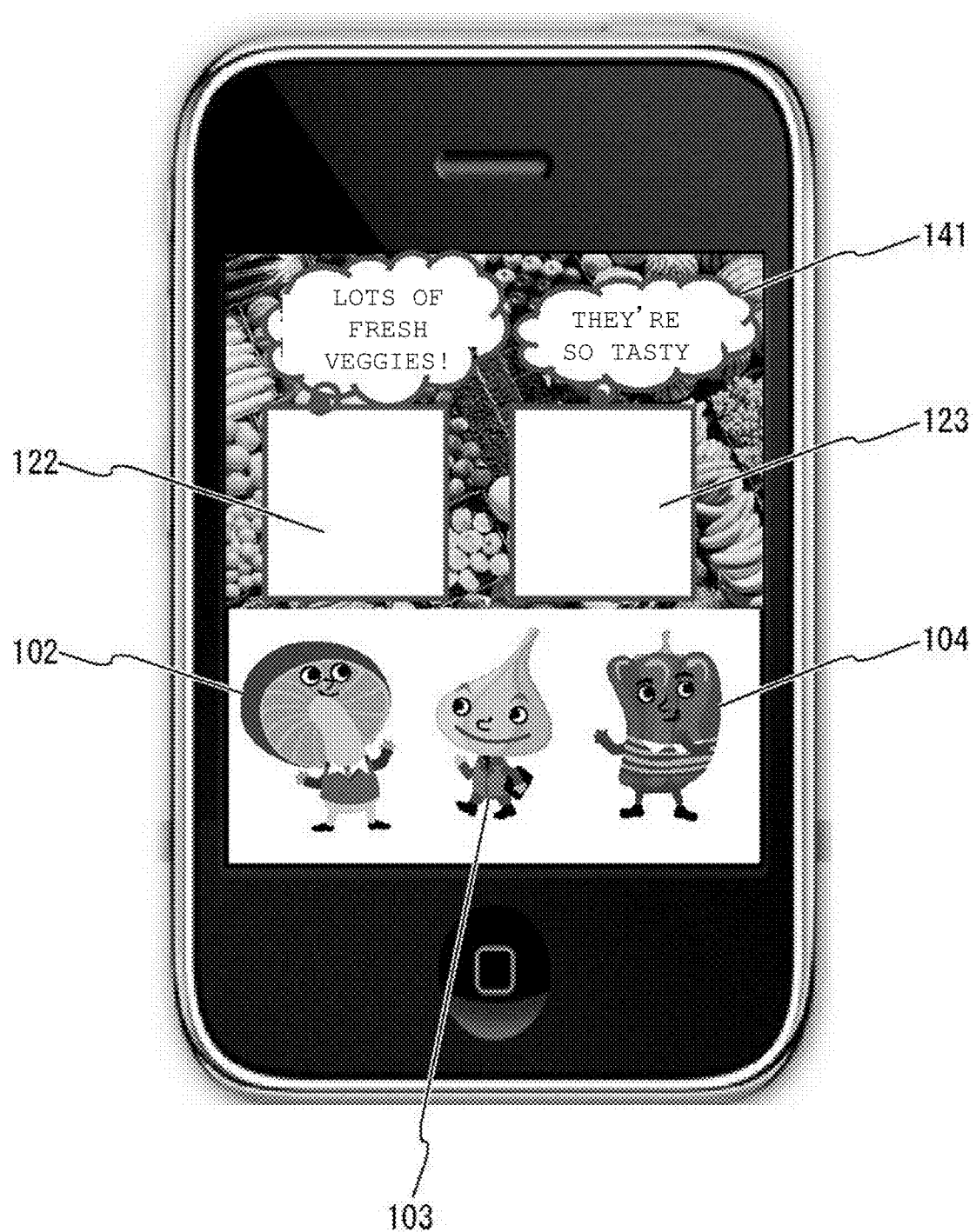
FIG. 14 is a diagram showing a screen example.

It is assumed that, as shown in FIG. 14, the information processing device 1 outputs a puzzle information (a screen) that includes a partial image 141, objects 102-104, and blank areas 122, 123.

The action information management table shown in FIG. 15 is assumed to be stored in the action information storage unit 14. Five sets of action information are stored in the action information management table. In this instance, the action information includes [the items of] "ID," "blank area identifier," "object identifier," and "executable information."

Let it be assumed that, under these circumstances, the user of the information processing device 1 has pinned the object 102 under a finger and dragged it, moving [the object] to the blank area 123. That is, the user has input a move command to move the object 102 to the blank area 123. Thereupon, the receiving unit 16 receives the move command.

A process analogous to that described in Specific Example 2 is then carried out. The decision unit 19 then assigns information to the effect that the condition was met, to a "decision result" variable.

Next, the execution unit 20 acquires the object identifier "102" and the blank area identifier "123." Next, the execution unit 20 acquires from the action information management table shown in FIG. 15 the executable information "e4.exe" that is paired with the object identifier "102" and the blank area identifier "123." The execution unit 20 then executes "e4.exe."

In Specific Example 5, no action is executed, even when the object of the object identifier "103" is arranged in the blank area of the blank area identifier "123." In this case, the execution unit 20 may output an error message or the like, and alert the user of improper operation or the like.

Specific Example 6

Specific Example 6 describes a case in which the decision unit 19 also carries out a route decision process.

Figure 16:
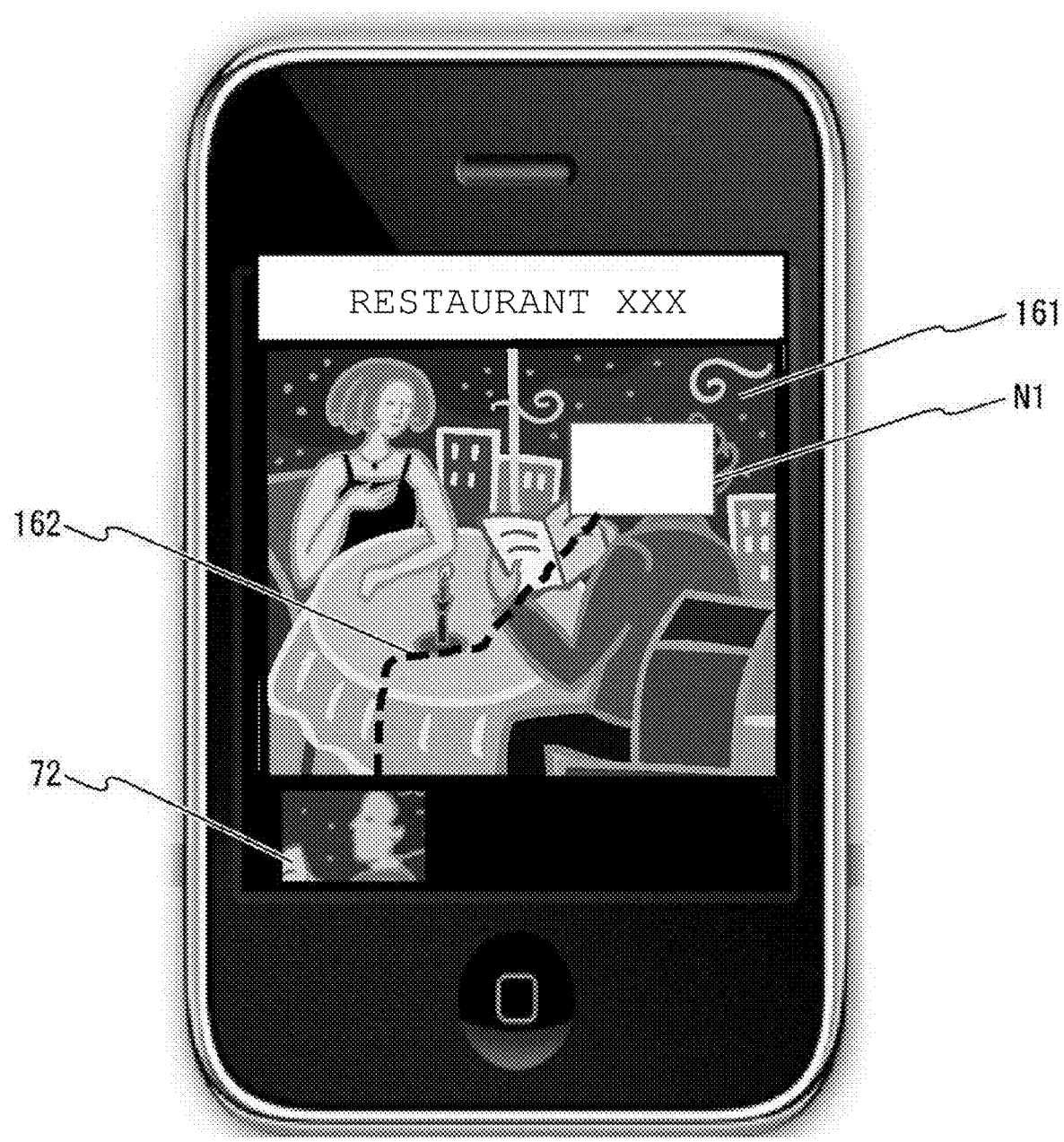
FIG. 16 is a diagram showing a screen example.

It is assumed that, as shown in FIG. 16, the information processing device 1 outputs a puzzle information (a screen) that includes a partial image 161, an object 71, and a blank area N1. The partial image 161 also includes a route 162. A collection of two or more items of position information representing the line of the route 162 is assumed to be stored in the route information storage unit 15. The position information is usually coordinate information (x, y).

Let it be assumed that, under these circumstances, the user of the information processing device 1 has pinned the object 72 under a finger and moved [the object] along the route 162 while dragging it so as to move [the object] into the blank area N1. That is, the user has input a move command to move the object 72 along the route 162, i.e., a move command to move the object 72 to the blank area N1. Thereupon, the receiving unit 16 receives the move command.

In response to the move command received by the receiving unit 16, the mover unit 18 acquires position information of the object 72, and temporarily collects the information into a buffer, not shown. A collection of position information indicating the trajectory of motion of the object 72 is collected in the buffer.

Next, by a process analogous to the process described in Specific Example 2, the decision unit 19 decides that the object 72 has been arranged in the blank area N1. That is, using the blank area position information corresponding to the blank area N1 and the position information that was last acquired, the decision unit 19 decides that the position of the object 72 is in a predetermined positional relationship with respect to the blank area. The decision unit 19 then acquires the blank area identifier "N1" and the object identifier "72" of the object targeted to be moved. Through the above, the arrangement decision process is brought to completion.

Next, the decision unit 19 carries out a route decision process. That is, the decision unit 19 acquires route information corresponding to the blank area "N1" from the route information storage unit 15.

Next, the decision unit 19 acquires the collection of position information from the buffer. A collection of position information refers to information indicating the trajectory of motion of the object 72.

Then, using the algorithm described in the flowchart of FIG. 4, the decision unit 19 decides whether the object 72 has moved along the route indicated by the route information. In this instance, the decision unit 19 is assumed to have decided that the object 72 moved along the route indicated by the route information. Through the above, the route decision process is brought to completion.

The execution unit 20 then acquires executable information from the action information management table. The execution unit 20 then executes the action that corresponds to the executable information.

According to the present embodiment set forth above, a prescribed action can be executed through an enjoyable operation. Also, according to the present embodiment, puzzles for achieving enjoyable operation can be generated automatically, and the load on the information processing device can be reduced.

Moreover, according to the present embodiment, a prescribed action can be executed by carrying out an operation to move an object to a blank space, and therefore, as compared with an interface in which a prescribed action is executed by pushing a button or the like, [the likelihood of] an unauthorized action being executed through unauthorized access by an external program or device can be prevented.

The processes in the present embodiment may be realized through software. The software may be distributed by means of software downloads or the like. The software may also be recorded onto recording media such as CD-ROM for dissemination. This pertains to the other embodiments in the present Description as well. The software for realizing the information processing device of the present embodiment is a program such as the following. Specifically, in this program, a recording medium accessible by a computer is equipped with a blank area storage unit able to store one or more items of blank area information that contains blank area position information relating to the position of a blank area, and an object storage unit able to store one or more objects, the program being employed to prompt a computer to function as an output unit for outputting one or more blank areas corresponding to one or more items of blank area information, and the one or more objects; a receiving unit for receiving a move command with respect to an object; a mover unit that, in response to a move command received by the receiving unit, moves the object that corresponds to the move command; a decision unit that decides whether the position of an object moved by the mover unit exists in a predetermined positional relationship with respect to a blank area; and an execution unit that, in cases where the decision unit decides that the predetermined positional relationship exists, executes an action that corresponds to the blank area or moved object.

Preferably, in the aforementioned program, the recording medium is further equipped with an action information storage unit able to store one or more items of action information which is information relating to an action corresponding to a blank area or an object, or to a blank area and an object; and the program prompts a computer to function such that, in cases where the decision unit has decided that the predetermined positional relationship exists, the execution unit acquires from the action information storage unit action information that corresponds to the blank area or to the moved object, or to the blank area and the moved object, and using the action information, executes an action that corresponds to the blank area or to the moved object, or to the blank area and the moved object.

Preferably, in the aforementioned program, the recording medium is further equipped with a route information storage unit able to store route information indicating a route over which an object is to be moved; and the program prompts a computer to function such that the decision unit additionally decides whether a movement route of an object moved by the mover unit satisfies a route indicated by the route information, and in cases where the decision unit decides that a route indicated by the route information is satisfied, and that a predetermined positional relationship exists, the execution unit executes an action that corresponds to the blank area or the moved object.

Preferably, in the aforementioned program, the program prompts a computer to function such that the output unit outputs a route in such a way that a route indicated by route information is visually recognizable.

Preferably, in the aforementioned program, the recording medium is further equipped with a partial image storage unit able to store partial images which are images having one or more blank areas therein; and the program prompts a computer to function such that the shape of one or more objects match the shape of any one or more of the blank areas, and a single full image is constituted by the partial image and one or more of the objects arranged in any one or more of the blank areas.

Preferably, in the aforementioned program, the recording medium is further equipped with a full image storage unit able to store a single full image; and the program prompts a computer to further function as a puzzle generation unit that cuts out a part of the full image, and acquires puzzle information that includes one or more objects that are cut-out sections, a partial image from which one or more objects have been cut out, and blank area information containing information about a blank area which is a cut-out area.

Embodiment 2

The present embodiment differs from Embodiment 1 in that puzzle information is generated by a puzzle generation server.

Figure 17:
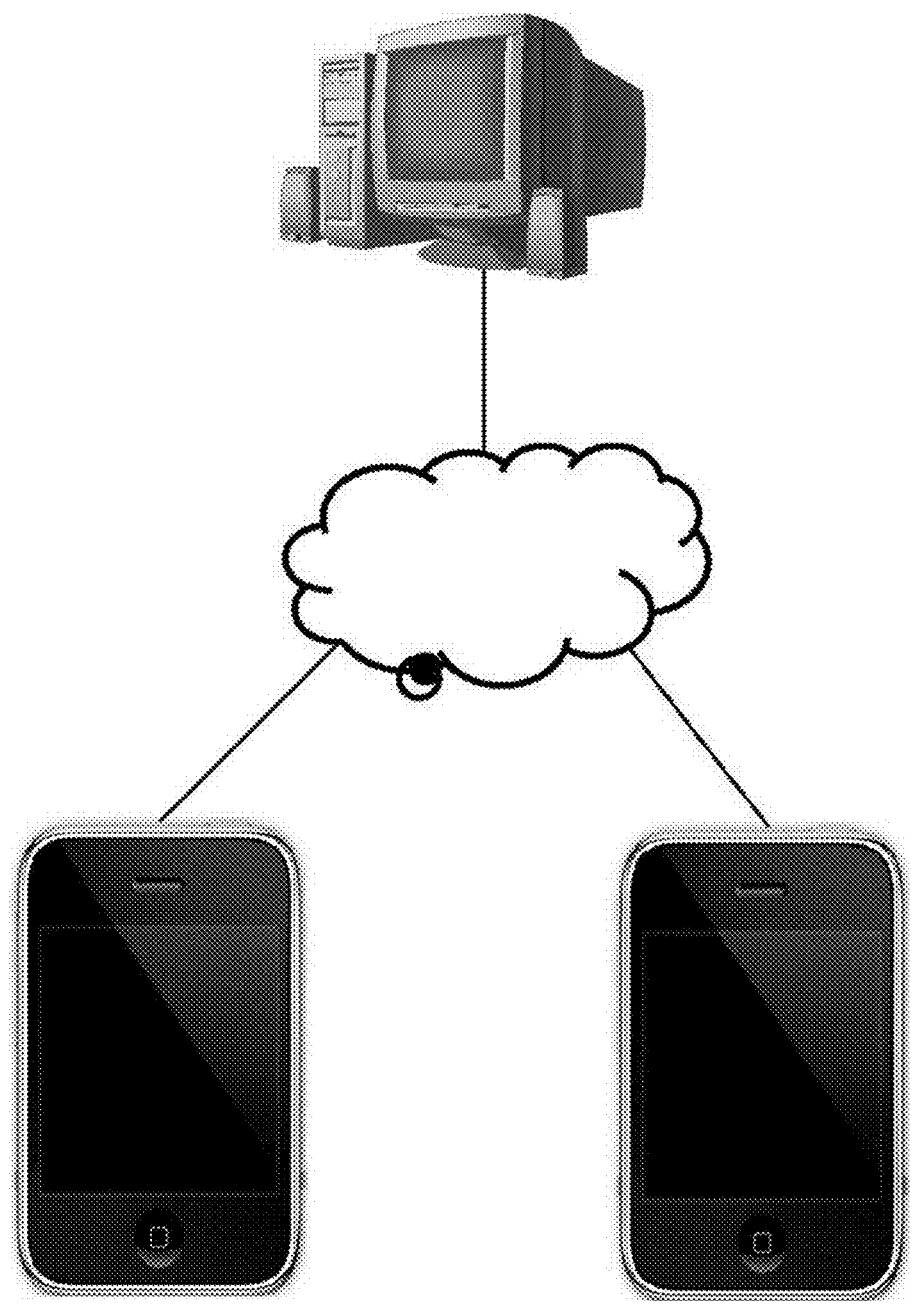
FIG. 17 is a conceptual diagram of an information system in a second embodiment.

FIG. 17 is a conceptual diagram of an information system in the present embodiment. This information system is provided with a puzzle generation server 3, and one or more information processing devices 4. The puzzle generation server 3 stores, for example, full images such as advertisements, and generates puzzle information from the full images, which is transmitted to the information processing devices 4.

Figure 18:
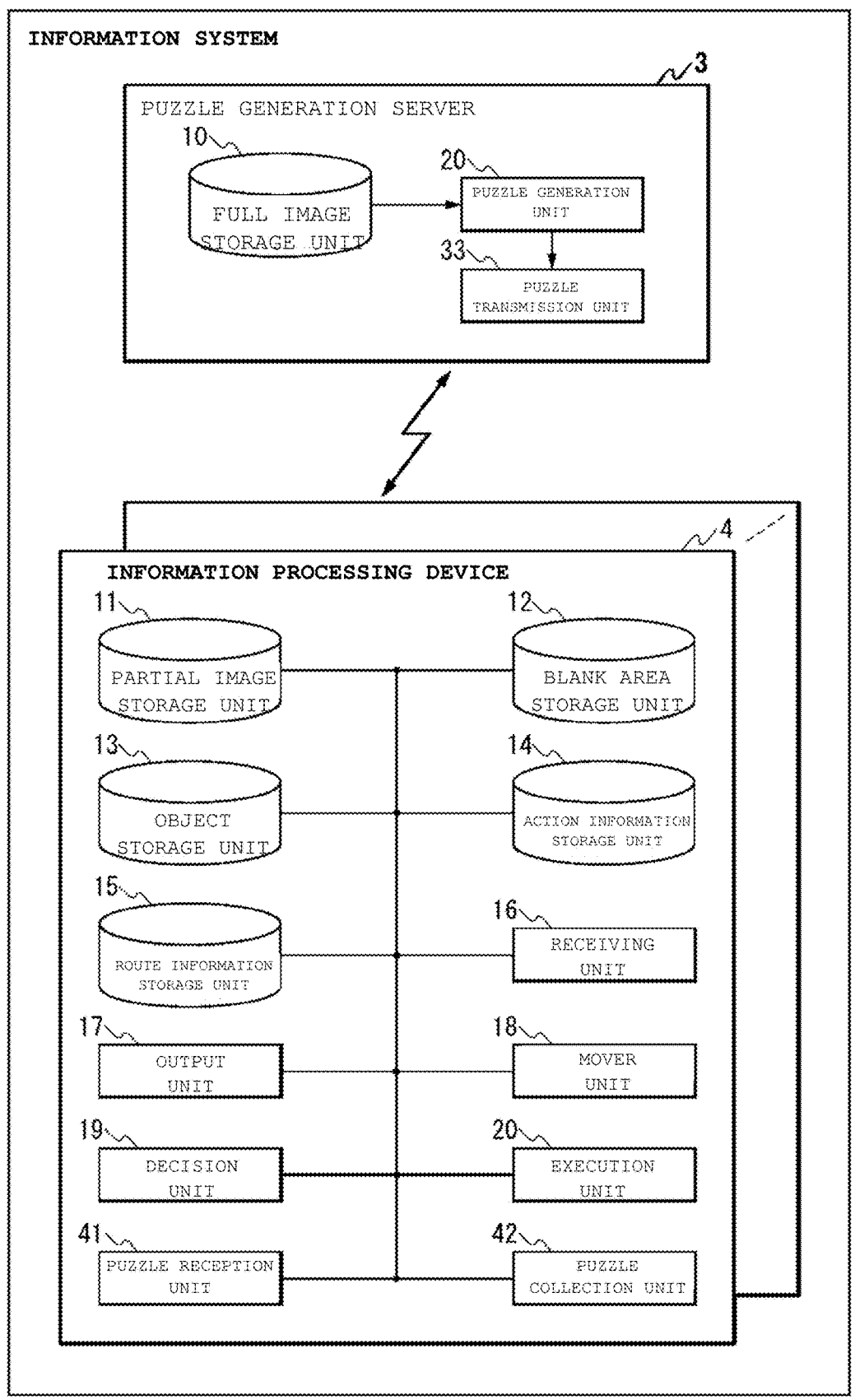
FIG. 18 is a block diagram of the information system.

FIG. 18 is a block diagram of the information system of the present embodiment. The puzzle generation server 3 is provided with a full image storage unit 10, a puzzle generation unit 21, and a puzzle transmission unit 33.

Each of the information processing devices 4 is provided with a partial image storage unit 11, a blank area storage unit 12, an object storage unit 13, an action information storage unit 14, a route information storage unit 15, a receiving unit 16, a puzzle receiving unit 41, a puzzle collection unit 42, an output unit 17, a mover unit 18, a decision unit 19, and an execution unit 20

The puzzle transmission unit 33 constituting the puzzle generation server 3 transmits puzzle information acquired by the puzzle generation unit 21 to the information processing devices 4. Here, in response to the puzzle generation server 3 having received a puzzle reception command from one of the information processing devices 4, the puzzle transmission unit 33 will preferably transmit puzzle information that includes one or more objects and a partial image. Usually, the puzzle transmission unit 33 is realized through wireless or wired transmission means, but realization through broadcasting means would also be acceptable.

The puzzle receiving unit 41 constituting the information processing device 4 receives puzzle information from the puzzle generation server 3. The puzzle receiving unit 41 is usually realized through wireless or wired transmission means, but realization through means for receiving broadcasts would also be acceptable.

The puzzle collection unit 42 collects one or more objects included in the puzzle information received by the puzzle receiving unit 41 into the object storage unit 13; collects partial images included in the puzzle information received by the puzzle receiving unit 41 into the into the partial image storage unit 11; and collects blank area information included in puzzle information received by the puzzle receiving unit 41 into the into the blank area storage unit 12. The puzzle collecting unit 42 may also collect action information contained in puzzle information received by the puzzle receiving unit 41 into the into the action information storage unit 14. The puzzle collection unit 42 may usually be realized through an MPU, memory, or the like. The processing routine of the puzzle collection unit 42 is usually realized through software, the software being recorded onto ROM or other such storage media. However, realization through hardware (dedicated circuitry) is also acceptable.

Next, the action of the information system shall be described. First, the action of the puzzle generation server 3 shall be described. The puzzle generation server 3 receives a puzzle generation command from the information processing device 4. Thereupon, the puzzle generation unit 21 reads out a full image from the full image storage unit 10, and generates puzzle information by the process described in Embodiment 1. The puzzle transmission unit 33 then transmits the generated puzzle information to the information processing device 4 that transmitted the puzzle generation command.

Next, the action of the information processing device 4 shall be described. When the receiving unit 16 of the information processing device 4 receives a generate puzzle command, transmission means, not illustrated, transmits the generate puzzle command to the puzzle generation server 3. Next, in response to transmission of the generate puzzle command, the puzzle receiving unit 41 receives puzzle information from the puzzle generation server 3. Next, the puzzle collection unit 42 collects one or more objects included in the puzzle information received by the puzzle receiving unit 41 into the object storage unit 13, collects partial images included in the puzzle information received by the puzzle receiving unit 41 into the into the partial image storage unit 11, and collects blank area information included in puzzle information received by the puzzle receiving unit 41 into the into the blank area storage unit 12.

The process of the information processing device 4, by which a prescribed action is executed by moving an object to a blank area, is the same as the process of the information processing device 1, and therefore description is omitted.

According to the present embodiment, puzzle information can be generated from a full image such as an advertisement, for example, and it is possible to provide the information processing device 4 with an application that employs the puzzle information.

The processes in the present embodiment may be realized through software. The software may be distributed by means of a software download or the like. The software may also be recorded onto recording media such as CD-ROM for dissemination. This pertains to the other embodiments in the present Description as well. The software for realizing the puzzle generation server 3 of the present embodiment is a program such as the following. Specifically, in this program, a recording medium is equipped with a full image storage unit able to store single full images, and the program prompts a computer to function as puzzle information generation unit that cuts out a part of the full image, and acquires puzzle information including one or more objects which are cut-out sections, a partial image from which one or more objects have been cut out, and blank area information containing information about a blank area which is a cut-out area, and as a puzzle transmission unit that transmits the puzzle information acquired by the puzzle information generation unit.

Figure 19:
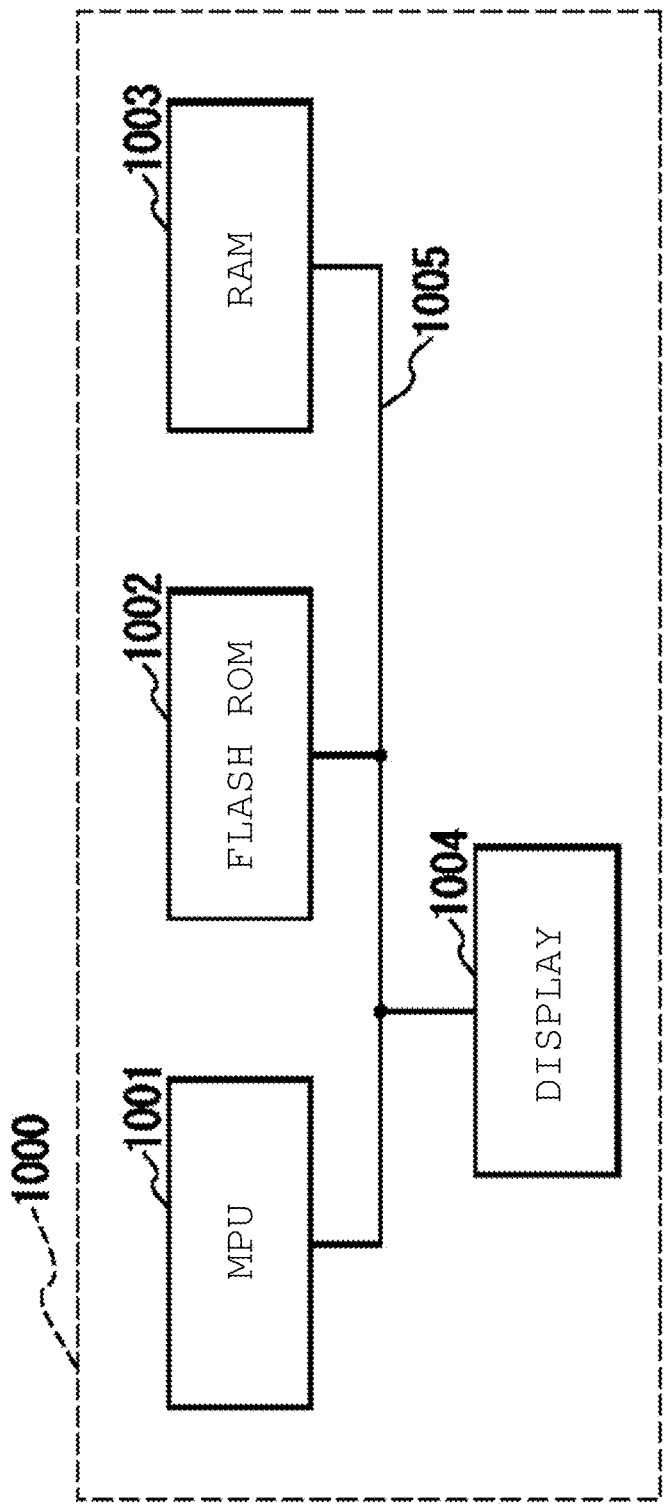
FIG. 19 is a block diagram of a computer system in the embodiment.

FIG. 19 is a block diagram of a system 1000 for executing the program set forth in the present Description, and realizing the information processing devices of the various embodiments shown above.

In FIG. 19, the system 1000 includes an MPU 1001, a flash ROM 1002, a RAM 1003, a display 1004, and a bus 1005. The bus 1005 is connected inter alia to the MPU 1001 and the flash ROM 1002. The flash ROM 1002 stores programs such as a boot-up program and the like. The RAM 1003 is connected to the MPU 1001, temporarily stores application program commands, and provides a temporary storage space. While not illustrated here, the information processing device 1000 may further include a network card that provides a connection to a LAN.

A program for prompting the system 1000 to execute the functions of the information processing device of the embodiment set forth above may be stored in the flash ROM 1002.

The program need not necessarily include an operating system or third party program for prompting the system 1000 to execute the functions of the information processing device of the embodiment set forth above. The program may include only parts of commands needed to call the appropriate functions (modules) in a controlled mode, so as to obtain the desired result. The manner of action of the system 1000 is widely known, and a detailed description is omitted.

In steps for transmitting information, and steps for receiving information, processes that are carried out by hardware, for example, processes carried out by a modem, interface card, or the like in transmission steps (processes carried out exclusively by hardware) are not included in the aforementioned program.

The computer that executes the program may be a single machine, or multiple machines. That is, both centralized processing and distributed processing are acceptable.

In the aforedescribed embodiments, two or more communication means existing in a single device may be realized through a single physical medium.

In the aforedescribed embodiments, the processes (functions) may be realized through centralized processing by a single device (system), or realized through distributed processing by multiple devices.

Whereas the information processing devices according to the various embodiments above have been described in the context of the configurations shown by way of example in FIGS. 1 to 18, the present invention includes modes wherein the configurations disclosed in the drawings are provided at least in part to a server device that is connected in communication enabled fashion to the information processing device via a communication circuit (including a wireless communication circuit or wired communication circuit), rather than being provided to the information processing device, or in addition to being provided to the information processing device. Therefore, according to the present invention, a communication terminal device, for example, a mobile telephone or the like, can execute the various actions (such as display on a screen or the like) shown by way of example in the present Description, by receiving web pages from a server device through the internet, a wireless communication circuit, or the like). In this case, the communication terminal device and the server device may each include at least some of the constituent elements disclosed in FIGS. 1 through 18 (including all of the elements). It should be noted that, in this sense, the "information processing device" disclosed in the appended claims includes not only the mobile telephones, tablet terminals, smartphones, and personal computers mentioned previously, but broadly includes server devices as well.

The present invention is not limited to the embodiments hereinabove; various modifications are possible within the scope of the present invention.

INDUSTRIAL APPLICABILITY

According to the various embodiments of the present invention shown herein, a prescribed action can be executed through an enjoyable operation, [a feature that] is useful in smartphones and the like.

The present application is based upon and claims priority from prior Japanese Patent Application No. 2013-141307, filed with the Japan Patent Office on Jul. 5, 2013, the entire contents of which are hereby incorporated herein by reference.

REFERENCE NUMBERS

1, 4 . . . Information processing device
3 . . . Puzzle generation server
10 . . . Full image storage unit
11 . . . Partial image storage unit
12 . . . Blank area storage unit
13 . . . Object storage unit
14 . . . Action information storage unit
15 . . . Route information storage unit
16 . . . Receiving unit
17 . . . Output unit 18 . . . Mover unit
19 . . . Decision unit
20 . . . Execution unit
21 . . . Puzzle generation unit
33 . . . Puzzle transmission unit
41 . . . Puzzle reception unit
42 . . . Puzzle collection unit

The invention claimed is:

1. An information processing device configured to receive a web page from a server device through the internet comprising:
    an output unit for obtaining from the web page and displaying on a display device one or more blank areas corresponding to one or more items of blank area information, and one or more objects including a first object;
    a receiving unit for receiving a move command with respect to the first object from a user when the one or more blank areas, the one or more objects, and a partial image are displayed on the display device in a state that a browser is able to receive another web page, wherein:
        each of the one or more objects is an image cut out from a full image,
        each of the one or more objects having a respective one of the blank areas as a region in the full image from which the each object has been cut out, a circumference of the region being surrounded by a full line or a dotted line, a first blank area being the respective blank area of the first object, and
        the partial image is an image left by cutting out the one or more objects from the full image;
    a mover unit that, in response to the move command received by the receiving unit, moves the first object; and
    an execution unit for, in cases that the position of the first object moved by the mover unit exists in a predetermined positional relationship with respect to the first blank area as determined based on first coordinates of the first object and second coordinates indicated by the items of blank area information corresponding to the first blank area, executing a first action that corresponds to the first blank area or to the first object,
    wherein the second coordinates, associated with the first blank area, are modified when a predetermined condition has been met,
    wherein the one or more objects are generated by cutting out from the full image on the basis of information indicating the number of objects to be generated from the full image, the information being associated with the full image, and
    wherein in cases where a movement route of the first object moved by the mover unit satisfies a line of a route indicated by route information that indicates the line of the route on which the first object is to be moved, the execution unit executes a second action that corresponds to the first blank area or to the first object.

2. The information processing device according to claim 1, wherein the executing the first action is based on action information that corresponds to at least one of the first blank area and the or the first moved object.

3. The information processing device according to claim 1, wherein the shape of the one or more objects matches the shape of any of the one or more blank areas, and
    a single full image is constituted by the one or more objects arranged in the one or more blank areas, and the partial image, which is an image containing the one or more blank areas therein.

4. The information processing device according to claim 3, wherein the single full image is an advertisement.

5. The information processing device according to claim 1, further comprising:
    a full image storage unit for storing a single full image; and
    a puzzle generation unit for cutting out a part of the full image, and for acquiring puzzle information.

6. The information processing device according to claim 2, further comprising:
    a full image storage unit for storing a single full image;
    a puzzle generation unit for cutting out a part of the full image, and for acquiring puzzle information;
    a puzzle receiving unit for receiving the puzzle information from a puzzle generation server equipped with a puzzle transmission unit for transmitting the puzzle information acquired by the puzzle generation unit; and
    a puzzle collection unit for collecting in an object storage unit the one or more objects, which are included in the puzzle information received by the puzzle receiving unit, for collecting in a partial image storage unit one or more partial images, including the partial image, that are included in the puzzle information received by the puzzle receiving unit, and collecting in a blank area storage unit the items of blank area information, which are included in the puzzle information received by the puzzle receiving unit.

7. The information processing device according to claim 1, wherein the one or more blank areas comprise at least two blank areas;
    the first object is arrangeable in two or more of the blank areas including the first blank area and a second blank area; and
    the first action is different for the first object moved to the first blank area or the second blank area.

8. The information processing device according to claim 1, wherein the one or more objects comprise at least the first object and a second object which are arrangeable in the first blank area; and
    the first action is different for a first case in which the first object is moved to the first blank area than for a second case in which the second object is moved to the first blank area.

9. An information processing method including:
    a step (a) for an information processing device, comprising obtaining from a web page and displaying on a display device one or more blank areas corresponding to one or more items of blank area information, and one or more objects including a first object, wherein the information processing device is configured to receive the web page from a server device through the internet;
    a step (b) for the information processing device, comprising receiving a move command with respect to the first object from a user when the one or more blank areas, the one or more objects, and a partial image are displayed on the display device in a state that a browser is able to receive another web page, wherein:
        each of the one or more objects is an image cut out from a full image,
        each of the one or more objects having a respective one of the blank areas as a region in the full image from which the each object has been cut out, a first blank area being the respective blank area of the first object, and
        the partial image is an image left by cutting out the one or more objects from the full image;

a step (c) for the information processing device, comprising moving the first object in response to the received move command; and a step (d) for executing an action corresponding to the first blank area or the moved first object, in cases that the position of the moved first object exists in a predetermined positional relationship with respect to the first blank area as determined on the basis of first coordinates of the moved first object and second coordinates indicated by the items of blank area information corresponding to the first blank area, wherein the second coordinates are modified when a predetermined condition has been met, wherein the one or more objects are generated by cutting out from the full image on the basis of information indicating the number of objects to be generated from the full image, the information being associated with the full image, wherein in cases where a movement route of the first object moved by the mover unit satisfies a path indicated by route information that indicates the path on which the first object is to be moved, the execution unit executes a second action that corresponds to the first blank area or to the moved first object, and wherein the path indicated by the route information is not displayed.

10. Non-transitory computer readable media storing program instructions which, when executed by an information processing device configured to receive a web page from a server device through the internet cause the information processing device to function as:

an output unit for obtaining from the web page and displaying on a display device one or more blank areas corresponding to one or more items of blank area information, and one or more objects including a first object;

a receiving unit for receiving a move command with respect to the first object from a user when the one or more blank areas, the one or more objects, and a partial image are displayed on the display device in a state that a browser is able to receive another web page, wherein:

each of the one or more objects is an image cut out from a full image, each of the one or more objects having a respective one of the blank areas as a region in the full image from which the each object has been cut out, a first blank area being the respective blank area of the first object, and the partial image is an image left by cutting out the one or more objects from the full image;

a mover unit for moving the first object in response to the move command received by the receiving unit; and an execution unit for, in cases that the position of the first object moved by the mover unit exists in a predetermined positional relationship with respect to the first blank area the positional relationship being determined on the basis of first coordinates of the first object and second coordinates indicated by the blank area information corresponding to the first blank area, executing a first action that corresponds to the first blank area or to the first object, wherein the second coordinates are modified when a predetermined condition has been met, wherein the one or more objects are generated by cutting out from the full image on the basis of information indicating the number of objects to be generated from the full image, the information being associated with the full image, wherein in cases where a movement route of the first object moved by the mover unit satisfies a trajectory indicated by route information that indicates the trajectory on which the first object is to be moved, the execution unit executes a second action that corresponds to the first blank area or to the first object, and wherein the trajectory indicated by the route information is not displayed.

11. The non-transitory computer-readable media of claim 10, wherein the blank areas are greater in number than the objects.

12. The non-transitory computer-readable media of claim 10, wherein the output unit is further configured to display on the display device one or more dummy objects which have not been cut out from the full image.

13. The non-transitory computer-readable media of claim 10, wherein the one or more blank areas comprise at least two blank areas;

the first object is arrangeable in two or more of the blank areas including the first blank area and a second blank area; and the first action is different for the first object moved to the first blank area or the second blank area.

14. The information processing device according to claim 1, wherein the one or more objects comprise at least the first object and a second object which are arrangeable in the first blank area; and the first action is different for a first case in which the first object is moved to the first blank area than for a second case in which the second object is moved to the first blank area.

15. The information processing device of claim 1, wherein the line of the route is displayed.

16. The information processing device of claim 1, wherein the line of the route is not displayed.

17. The information processing device of claim 1, wherein the line of the route has at least two protruding portions.

18. The information processing method of claim 9, wherein the one or more blank areas comprise at least two blank areas;

the first object is arrangeable in two or more of the blank areas including the first blank area and a second blank area; and the first action is different for the first object moved to the first blank area or the second blank area.

* * * * *